United States Patent
Sato

[11] Patent Number: 5,621,634
[45] Date of Patent: Apr. 15, 1997

[54] POWER CONVERTER

[75] Inventor: Shinji Sato, Tokyo, Japan

[73] Assignee: Kabushiki Kaisha Toshiba, Kawasaki, Japan

[21] Appl. No.: 598,355

[22] Filed: Feb. 8, 1996

[30] Foreign Application Priority Data

Feb. 14, 1995 [JP] Japan .................................. 7-025163
Jun. 28, 1995 [JP] Japan .................................. 7-162572

[51] Int. Cl.$^6$ ............................................... H02M 3/24
[52] U.S. Cl. ................................... 363/98; 363/96
[58] Field of Search ............................. 363/17, 95, 96, 363/97, 98, 131, 132, 135, 136

[56] References Cited

U.S. PATENT DOCUMENTS

| | | | |
|---|---|---|---|
| 5,047,913 | 9/1991 | De Doncker et al. | 363/95 |
| 5,155,675 | 10/1992 | Mauyama et al. | 363/98 |
| 5,253,157 | 10/1993 | Severinsky | 363/98 |
| 5,475,580 | 12/1995 | Noro | 363/24 |

FOREIGN PATENT DOCUMENTS 5502365  4/1993  Japan .

OTHER PUBLICATIONS

IEEE, pp. 1228–1235, Oct. 1990, R. W. De Doncker, et al., "The Auxiliary Resonant Commutated Pole Converter".

Primary Examiner—Matthew V. Nguyen
Attorney, Agent, or Firm—Oblon, Spivak, McClelland, Maier & Neustadt, P.C.

[57] ABSTRACT

A power converter including a series circuit of DC power sources, a series circuit of positive side and negative side reverse conducting semiconductor switches. The power converter also includes a forward diode and a reverse diode connected from a neutral-point power source terminal toward the positive side and negative side reverse conducting semiconductor switches, respectively. The power converter includes intermediate DC power sources connected to the neutral-point power source terminal for generating predetermined voltages between potentials of positive side and negative side power source terminals and the neutral-point power source terminal, respectively, and commutation circuits composed of a series circuit of a two-way semiconductor switch and a reactor connected between the positive side and negative side intermediate voltage terminals and the positive side and negative side conductive semiconductor switches, respectively. The power converter further includes a voltage change-rate suppressing capacitor connected between one of power source terminals, the neutral-point power source terminal, intermediate voltage terminals and one of connecting points of adjacent two of the reverse conducting semiconductor switches.

16 Claims, 14 Drawing Sheets

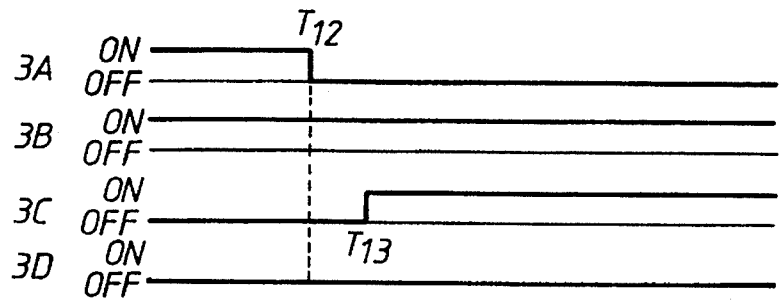

CONTROL SIGNALS OF SEMICONDUCTOR SWITCHES 3A, 3B, 3C AND 3D.

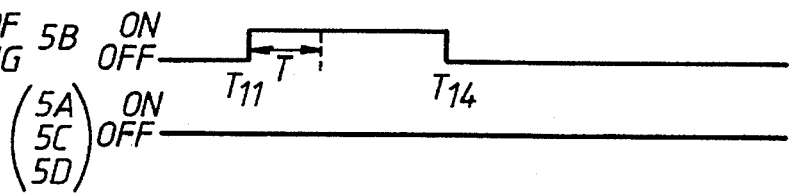

CONTROL SIGNALS OF REVERSE CONDUCTING SEMICONDUCTOR SWITCHES 5A, 5B, 5C AND 5D.

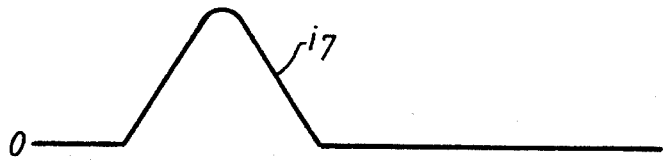

CURRENT $i_7$ OF REACTOR 7

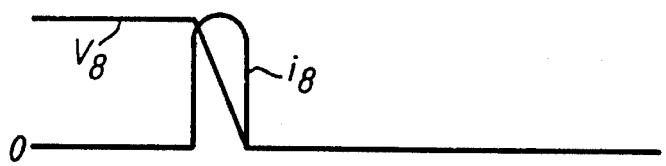

CURRENT $i_8$, VOLTAGE $v_8$ OF CAPACITOR 8

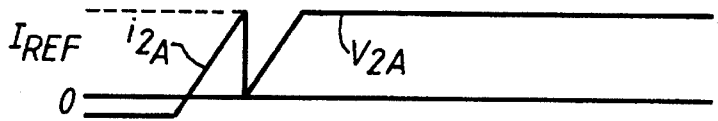

CURRENT $i_{2A}$, VOLTAGE $v_{2A}$ OF REVERSE CONDUCTING SEMICONDUCTOR SWITCH 2A

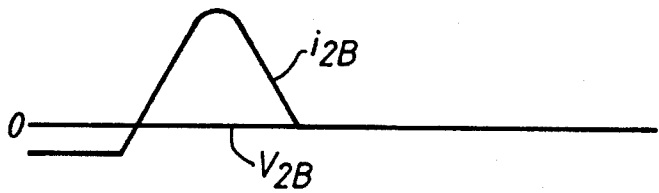

CURRENT $i_{2B}$, VOLTAGE $v_{2B}$ OF REVERSE CONDUCTING SEMICONDUCTOR SWITCH 2B

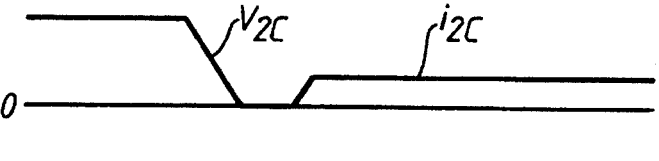

CURRENT $i_{2C}$, VOLTAGE $v_{2C}$ OF REVERSE CONDUCTING SEMICONDUCTOR SWITCH 2C

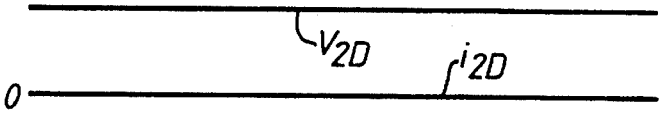

CURRENT $i_{2D}$, VOLTAGE $v_{2D}$ OF REVERSE CONDUCTING SEMICONDUCTOR SWITCH 2D

Fig. 7

| MODE | STATE OF SWITCHES | | | | VU |
|---|---|---|---|---|---|
| | 3A | 3B | 3C | 3D | |
| 1 | ON | ON | OFF | OFF | +VDC |
| 3 | OFF | ON | ON | OFF | 0 |
| 5 | OFF | OFF | ON | ON | −VDC |

| MODE | STATE OF SWITCHES | | | | IU | VU |
|---|---|---|---|---|---|---|
| | 3A | 3B | 3C | 3D | | |
| 1 | ON | ON | OFF | OFF | | +VDC |
| 2A | OFF | ON | OFF | OFF | < 0 | +VDC |
| 2B | | | | | ≥ 0 | 0 |
| 3 | OFF | ON | ON | OFF | | 0 |
| 4A | OFF | OFF | ON | OFF | < 0 | 0 |
| 4B | | | | | ≥ 0 | -VDC |
| 5 | OFF | OFF | ON | ON | | -VDC |

*Fig.15* (PRIOR ART)

| MODE | ANODE TO CATHODE VOLTAGE | | | | VU |
|---|---|---|---|---|---|
| | 3A | 3B | 3C | 3D | |
| 1 | 0 | 0 | +VDC | +VDC | +VDC |
| 2A | 0 | 0 | +VDC | +VDC | +VDC |
| 2B | +VDC | 0 | 0 | +VDC | 0 |
| 3 | +VDC | 0 | 0 | +VDC | 0 |
| 4A | +VDC | 0 | 0 | +VDC | 0 |
| 4B | +VDC | +VDC | 0 | 0 | -VDC |
| 5 | +VDC | +VDC | 0 | 0 | -VDC |

*Fig.16* (PRIOR ART)

| MODE | STATE OF SWITCHES | | | | | | IU | VU |
| --- | --- | --- | --- | --- | --- | --- | --- | --- |
| | 3A | 3B | 3C | 3D | 3E | 3F | | |
| 1 | ON | ON | ON | OFF | OFF | OFF | — | +3VDC |
| 2A | OFF | ON | ON | OFF | OFF | OFF | < 0 | +3VDC |
| 2B | | | | | | | ≧ 0 | +2VDC |
| 3 | OFF | ON | ON | ON | OFF | OFF | — | +2VDC |
| 4A | OFF | OFF | ON | ON | OFF | OFF | < 0 | +2VDC |
| 4B | | | | | | | ≧ 0 | +VDC |
| 5 | OFF | OFF | ON | ON | ON | OFF | — | +VDC |
| 6A | OFF | OFF | OFF | ON | ON | OFF | < 0 | +VDC |
| 6B | | | | | | | ≧ 0 | 0 |
| 7 | OFF | OFF | OFF | ON | ON | ON | — | 0 |

Fig. 18 (PRIOR ART)

| MODE | ANODE TO CATHODE VOLTAGE | | | | | | VU |
| --- | --- | --- | --- | --- | --- | --- | --- |
| | 3A | 3B | 3C | 3D | 3E | 3F | |
| 1 | 0 | 0 | +VDC | +VDC | +VDC | +VDC | +3VDC |
| 2A | 0 | 0 | +VDC | +VDC | +VDC | +VDC | +3VDC |
| 2B | +VDC | 0 | 0 | 0 | +VDC | +VDC | +2VDC |
| 3 | +VDC | 0 | 0 | 0 | +VDC | +VDC | +2VDC |
| 4A | +VDC | 0 | 0 | 0 | +VDC | +VDC | +2VDC |
| 4B | +VDC | +VDC | 0 | 0 | 0 | +VDC | +VDC |
| 5 | +VDC | +VDC | 0 | 0 | 0 | +VDC | +VDC |
| 6A | +VDC | +VDC | 0 | 0 | 0 | +VDC | +VDC |
| 6B | +VDC | +VDC | +VDC | 0 | 0 | 0 | 0 |
| 7 | +VDC | +VDC | +VDC | 0 | 0 | 0 | 0 |

Fig. 19 (PRIOR ART)

POWER CONVERTER

BACKGROUND OF THE INVENTION

1. Field of the Invention

This invention relates to a power converter, and more particularly to a multi-level output power converter used, for instance, in variable speed control of AC motors.

2. Description of the Related Art

Power converters constructed using power semiconductor devices for power conversion have been used in many fields.

Power converters capable of providing multi-level power outputs such as a neutral-point-clamped power converter, etc. are able to reduce the voltage load of power semiconductor devices composing the converters. Furthermore, compared with ordinary power converters, desired output waveforms are obtained at less switching frequency, and therefore, these converters are used as power converters for driving large capacity AC motors in variable speeds.

FIG. 13 shows the construction of a conventional neutral-point-clamped power converter, as a first example of a conventional multi-level output power converter. The operation, etc. of this system have been described in detail in, for instance, "A New Neutral-Point-Clamped PWM Inverter" (IEEE TRANSACTIONS ON INDUSTRY APPLICATIONS", VOL. IA-17, No. 5 SEPTEMBER/OCTOBER 1981; AKIRA NABAE and others).

In FIG. 13, 1A and 1B are DC power sources, 2A–2D are reverse conducting semiconductor switches, 3A–3D are semiconductor switches such as gate-turn-off thyristors and 4A–4F are diodes. Reverse conducting semiconductor switches 2A–2D are respectively composed of semiconductive switches 3A–3D and diodes 4A–4F connected in anti-parallel.

Potentials at a positive side power terminal A, a neutral-point power terminal B, and a negative side power terminal C shown in FIG. 13 are $+V_{DC}$, 0, and $-V_{DC}$, respectively. An output voltage $V_U$ of an output terminal T of this power converter becomes as shown in FIG. 14 depending on the state of semiconductor switches 3A–3D.

However, as actually there are delayed times in the operation of semiconductor switches 3A–3D, Mode 2A (or Mode B) and Mode 4A (or Mode 4B) are inserted for about several microseconds from Mode 1 to Mode 3 (or from Mode 3 to Mode 1), and from Mode 3 to Mode 5 (or Mode 5 to Mode 3), respectively as shown in FIG. 15. This period is called a dead time, and the output voltages during these periods are decided depending on the direction of load currents. Because of this, on some converters, the timing of the switching is adjusted according to the direction of load current to suppress the output waveform from being deformed by the dead time.

Further, the anode to cathode voltages of semiconductor switches 3A–3D in each mode are as shown in FIG. 16.

As shown in FIG. 16, the neutral-point clamped power converter has the feature that the voltage applied to each of semiconductor switches 2A–2D is one-half of the DC voltage between terminals A and C.

However, the voltages shown in FIG. 16 are of theoretical magnitudes. For instance, when shifting from Mode 4B (the state where the load current flows through diodes 4C–4D) to Mode 3 by turning ON semiconductor switch 3B, the surges are generated as described below. As DC power source 1B is short circuited in the route of diode 4E and reverse conducting semiconductor switches 2B, 2C and 2D during the transition period from the time when semiconductor switch 3B is turned ON to the time when diode 4D is recovered (shifted from the ON state to the blocking state) and the voltage of semiconductor switch 3D becomes $V_{DC}$, the surge current flows in this closed loop, and after diode 4D is recovered, the surge voltage is generated in diode 4D. Similar surges are generated when Mode 2B is shifted to Mode 1, Mode 2A is shifted to Mode 3 and Mode 4A is shifted to Mode 5, respectively.

FIG. 17 shows the construction of a four-value output power converter as a second example of a conventional multi-level output power converter. This system also has been described in detail in "A New Neutral-Point-Clamped PWM Inverter (IEEE TRANSACTIONS ON INDUSTRY APPLICATIONS", VOL. IA-17, No. 5, SEPTEMBER/OCTOBER 1981; AKIRA NABAE and others) as the neutral-point-clamped power converter shown in FIG. 13.

In FIG. 17, 1A–1C are DC power sources, 2A–2E are reverse conducting semiconductor switches composed of semiconductor switches 3A–3F and diodes 4A–4J connected in anti-parallel, respectively.

Potentials of power terminals A, B, C and D are $3\times V_{DC}$, $+2\times V_{DC}$, $+V_{DC}$, and 0, respectively. Output voltage $V_U$ of output terminal T of this power converter becomes as shown in FIG. 18 depending on the state of semiconductor switches 3A–3F.

Further, the anode to cathode voltages of semiconductor switches 3A–3F in each mode are as shown in FIG. 19.

As shown in FIG. 19, the four-value output power converter has the feature that the voltage applied to each of semiconductor switches 3A–3F is one third of the DC voltage between terminals A and D.

Other operations and the voltages of semiconductor devices are the same as in the neutral-point-clamped power converter shown in FIG. 13.

In the conventional multi-level output power converters as shown in FIGS. 13 and 17, they are featured that the desired output waveforms are obtained at less switching frequency, and high voltage conversion can be made with low withstand voltage semiconductor switches. However, during the time of the mode switching, surge current as well as surge voltage may be generated as described above.

SUMMARY OF THE INVENTION

Accordingly, one object of this invention is to provide a power converter which can be operated without generating the surge voltage and the surge current.

Another object of this invention is to provide a power converter wherein the high voltage conversion can be made with low withstand voltage semiconductor switches.

Still another object of this invention is to provide a power converter which can obtain the desired output waveforms at relatively low switching frequency.

These and other objects of this invention can be achieved by providing a power converter including a series circuit of a positive side DC power source and a negative side DC power source connected at a neutral-point power source terminal. A direction from an anode to a cathode is designated as forward direction and a direction from a cathode to an anode is designated as reverse direction. The power converter further includes a series circuit of a positive side first reverse conducting semiconductor switch and a positive side second reverse conducting semiconductor switch connected in series in the forward direction from a positive side power source terminal of the positive side DC power source toward an AC output terminal of the power converter, and a series circuit of a negative side first reverse conducting semiconductor switch and a negative side second reverse conducting semiconductor switch connected in series in the reverse direction from a negative side power source terminal of the negative side DC power source toward the AC output terminal. The power converter also includes a forward diode connected from the neutral-point-power source terminal toward a cathode of the positive side first reverse conducting semiconductor switch in the forward direction, and a reverse diode connected from the neutral-point-power source terminal toward an anode of the negative side first reverse conducting semiconductor switch in the reverse direction. The power converter includes a positive side intermediate DC power source connected to the neutral-point power source terminal for generating a predetermined voltage between potentials of the positive side power source terminal and the neutral-point power source terminal at a positive side intermediate voltage terminal, and a negative side intermediate DC power source connected to the neutral-point power source terminal for generating a predetermined voltage between potentials of the negative side power source terminal and the neutral-point power source terminal at a negative side intermediate voltage terminal. The power converter also includes a first commutation circuit composed of a series circuit of a two-way semiconductor switch capable of controlling forward and reverse currents individually and a reactor, connected between the positive side intermediate voltage terminal and a cathode of the positive side first reverse conducting semiconductor switch, and a second commutation circuit composed of a series circuit of a two-way semiconductor switch capable of controlling forward and reverse currents individually and a reactor, connected between the negative side intermediate voltage terminal and an anode of the negative side first reverse conducting semiconductor switch. The power converter further includes a voltage change-rate suppressing capacitor connected between one of the positive side power source terminal, the neutral-point power source terminal, the negative side power source terminal, the positive side intermediate voltage terminal and the negative side intermediate voltage terminal and one of connecting points of adjacent two of the positive side first reverse conducting semiconductor switch, the positive side second reverse conducting semiconductor switch, the negative side second reverse conducting semiconductor switch and the negative side first reverse conducting semiconductor switch.

According to another aspect of this invention, there can be provided a power converter including a series circuit of a plurality of DC power sources composed of a first DG power source through a n-th DC power source. A plurality of positive side terminals of the DC power sources are designated as a first power source terminal through a n-th power source terminal, respectively, and a negative side terminal of the n-th DC power source is designated as a (n+1)-th power source terminal. A direction from an anode to a cathode is designated as forward direction and a direction from a cathode to an anode is designated as reverse direction. The power converter also includes a series circuit of a plurality of positive side reverse conducting semiconductor switches composed of a positive side first reverse conducting semiconductor switch through a positive side n-th reverse conducting semiconductor switch connected in series in the forward direction from the first power source terminal toward an AC output terminal of the power converter. The positive side first reverse conducting semiconductor switch connected to the first power source terminal is firstly operated in a plurality of the positive side reverse conducting semiconductor switches. The power converter further includes a series circuit of a plurality of negative side reverse conducting semiconductor switches composed of a negative side n-th reverse conducting semiconductor switch through a negative side first reverse conducting semiconductor switch connected in series in the reverse direction from the (n+1)-th power source terminal toward the AC output terminal. The negative side n-th reverse conducting semiconductor switch connected to the (n+1)-th power source terminal is firstly operated in a plurality of the negative side reverse conducting semiconductor switches. The power converter also includes a plurality of forward diodes connected from the second through n-th power source terminals toward anodes of the positive side second through n-th reverse conducting semiconductor switches in the forward detection, respectively, and a plurality of reverse diodes connected from the second through n-th power source terminals toward anodes of the negative side second through n-th reverse conducting semiconductor switches in the reverse detection, respectively. The power converter also includes a plurality of intermediate DC power sources composed of a first intermediate DC power source through n-th intermediate DC power source connected to the second through (n+1)-th power source terminals for generating predetermined voltages between potentials of the first and second power source terminals through between potentials of the n-th and (n+1)-th power source terminals at a first intermediate voltage terminal through a n-th intermediate voltage terminal, respectively. The power converter further includes a plurality of commutation circuits composed of a first commutation circuit through a n-th commutation circuit, each composed of a series circuit of a two-way semiconductor switch capable of controlling forward and reverse currents individually and a reactor, connected between the first through n-th intermediate voltage terminals and an intermediate terminal, respectively, and a reactor connected between the intermediate terminal and the AC output terminal. The power converter also includes a voltage-change-rate suppressing capacitor connected between one of the first through (n+1)-th power source terminals and the first through n-th intermediate voltage terminals and one of connecting points of adjacent two of the positive side reverse conducting semiconductor switches and the negative side reverse conducting semiconductor switches.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 7 is a waveform chart for explaining the operation of the circuit shown in FIG. 6;

FIG. 15 is a diagram showing the states and output voltages of semiconductor switches 3A–3D in FIG. 13;

FIG. 16 is a diagram showing the anode to cathode voltages of semiconductor switches 3A–3D in FIG. 13;

FIG. 18 is a diagram showing the states and output voltages of semiconductor switches 3A–3F in FIG. 17; and FIG. 19 is a diagram showing the anode to cathode voltages of semiconductor switches 3A–3F in FIG. 17.

DETAILED DESCRIPTION OF THE PREFERRED EMBODIMENTS

Figure 1:
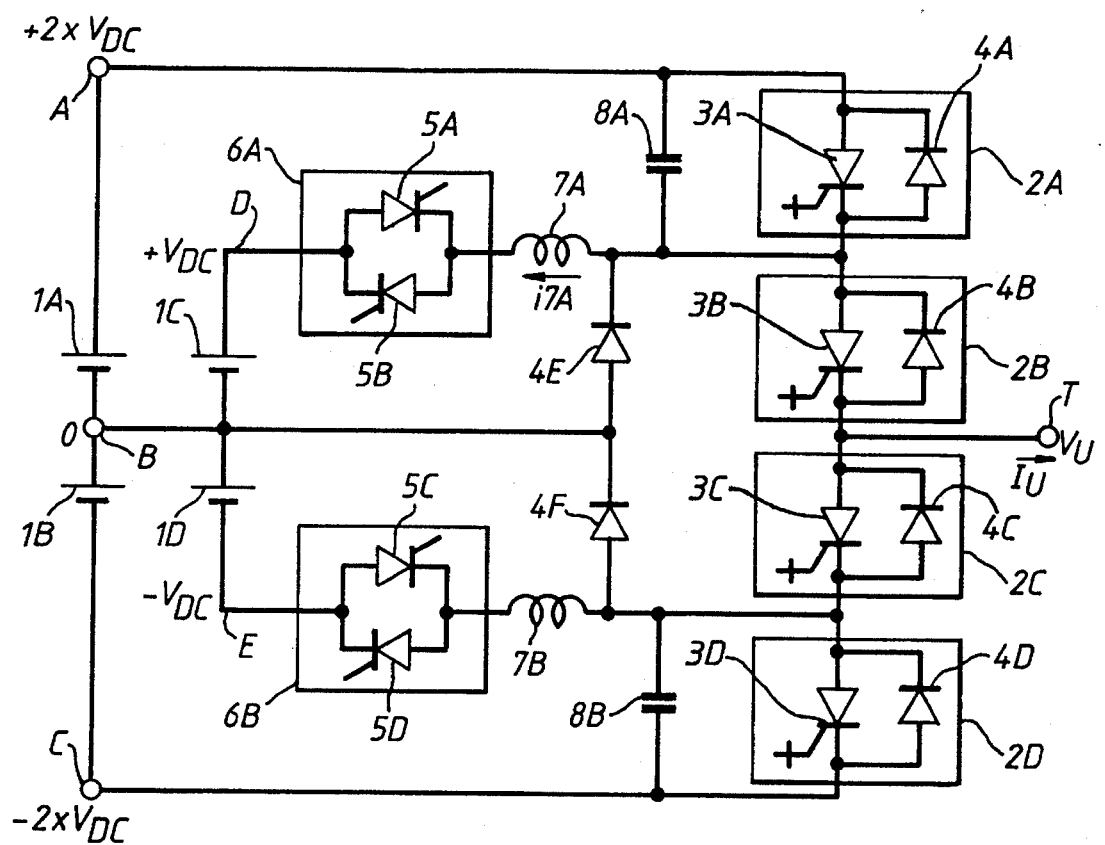
FIG. 1 is a circuit diagram showing a power converter according to a first embodiment of this invention.

Referring now to the drawings, wherein like reference numerals designate identical or corresponding parts throughout the several views, the embodiments of this invention will be described below.

FIG. 1 is a circuit diagram showing a neutral-point-clamped power converter according to a first embodiment of this invention.

Figures 13, 14:
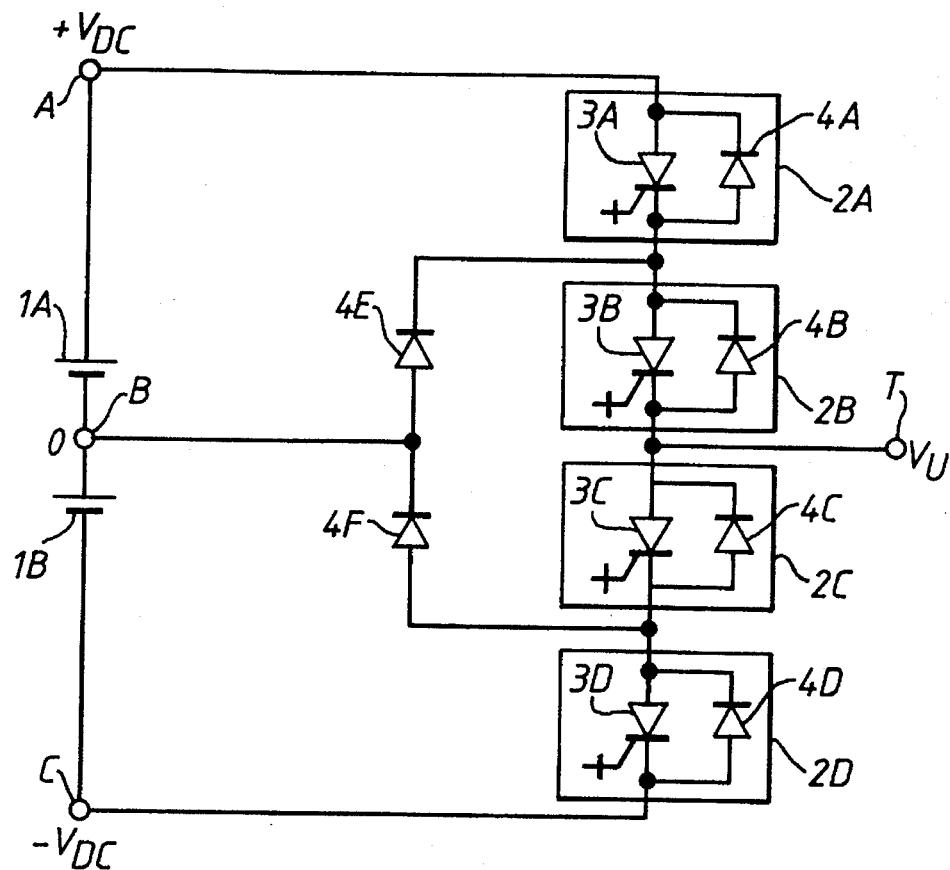
FIG. 13 is a circuit diagram showing one example of a conventional neutral-point-clamped power converter.
FIG. 14 is a diagram showing the states and modes of semiconductor switches 3A–3D in FIG. 13.
Figure 17:
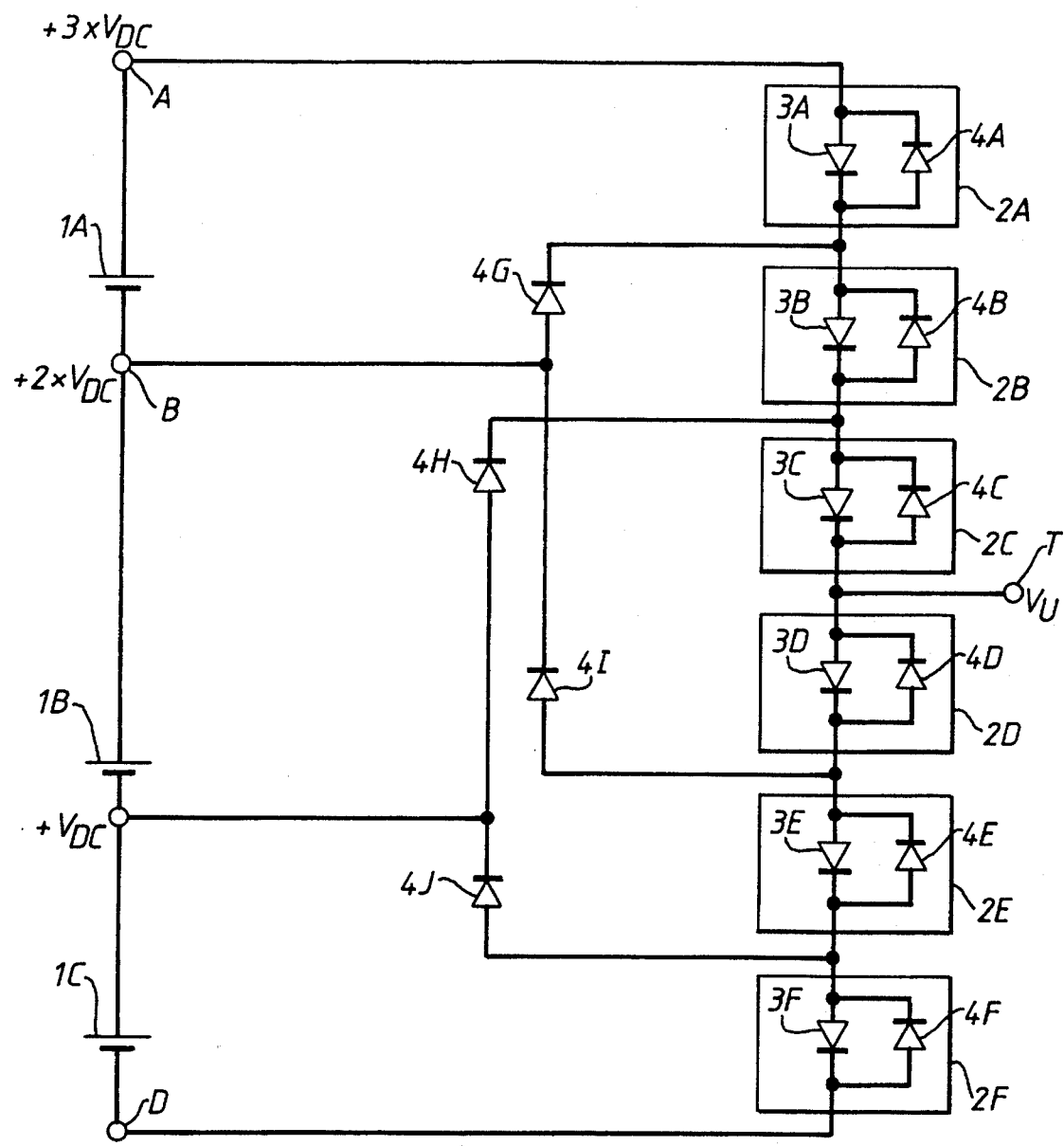
FIG. 17 is a circuit diagram showing one example of a conventional four-value output power converter.

In FIG. 1, this embodiment differs from the conventional neutral-point-clamped power converter shown in FIG. 13 in that DC power sources 1C, 1D, reverse blocking semiconductor switches, such as thyristors, 5A–5D, reactors 7A, 7B and voltage change-rate suppressing capacitors 8A, 8B have been newly provided. Two-way semiconductor switches 6A, 6D are respectively composed of reverse blocking semiconductor switches 5A and 5B, 5C and 5D connected in anti-parallel.

The neutral-point-clamped power converter shown in FIG. 1 has the construction described below. Two DC power sources 1A, 1B are connected in series, one of which is designated as a positive side DC power source 1A and the other as a negative side DC power source 1B. A positive side terminal of positive side DC power source 1A is designated as a positive side power terminal A, a negative side terminal of negative side DC power source 1B as a negative side power terminal C, and a connecting point of positive side DC power source 1A and negative side DC power source 1B as a neutral-point power terminal B. Here, when the detection from the anode to the cathode is regarded as the forward direction and the direction from the cathode to the anode is regarded as the reverse detection. A positive side first reverse conducting semiconductor switch 2A and a positive side second reverse conducting semiconductor switch 2B are connected in series in the forward direction from positive side power terminal A toward AC output terminal T. A negative side first reverse conducting semiconductor switch 2D and a negative side second reverse conducting semiconductor switch 2C are connected in series in the reverse direction from negative side voltage terminal C toward AC output terminal T. Diode 4E is connected in the forward direction from neutral-point power terminal B toward the cathode of positive side first reverse conducting semiconductor switch 2A. Diode 4F is connected in the reverse direction from neutral-point power terminal B toward the anode of negative side first reverse conducting semiconductor switch 2D.

Further, there are provided a positive side intermediate voltage terminal D having a predetermined potential between the potential of positive side power terminal A and that of neutral-point power terminal B, and a negative side intermediate voltage terminal E having a predetermined potential between the potential of negative side power terminal C and that of neutral-point power terminal B.

There is provided two-way semiconductor switch 6A composed of reverse conducting semiconductor switches 5A, 5B connected in anti-parallel so that forward and reverse currents can be controlled individually. A first commutation circuit composed of series connected two-way semiconductor switch 6A and reactor 7A is connected between positive side intermediate voltage terminal D and the cathode of positive side first reverse conducting semiconductor switch 2A.

There is provided two-way semiconductor switch 6B composed of reverse conducting semiconductor switches 5C, 5D connected in anti-parallel so that forward and reverse currents can be controlled individually. A second commutation circuit composed of series connected two-way semiconductor switch 6B and reactor 7B is connected between negative side intermediate voltage terminal E and the anode of negative side first reverse conducting semiconductor switch 2D.

Then, positive side voltage change-rate suppressing capacitor 8A is connected between the anode and the cathode of positive side first reverse conducting semiconductor switch 2A, and negative side voltage change-rate suppressing capacitor 8B is connected between the anode and the cathode of negative side first reverse conducting semiconductor switch 2D.

Here, the operation of the embodiment shown in FIG. 1 will be described referring to FIG. 2. First, the circuit conditions will be described. That is, the capacity of the reactors 7A, 7B is assumed to be L, the capacity of the voltage change-rate suppressing capacitors 8A, 8B is C, the voltage of DC power source 1A, 1B is $2 \times V_{DC}$, the potentials of terminals A, B, C are $+2 \times V_{DC}$, 0, $-2 \times V_{DC}$, respectively. Further, the voltage of DC power source 1C, 1D is $V_{DC}$, the potentials of terminals D, E are $+V_{DC}$, $-V_{DC}$ and a load current of this power converter is $I_U$. The switching time between Modes is assumed to be sufficiently shorter than an output current changing time, and the change amount of load current $I_U$ during the switching is disregarded.

Figure 2:
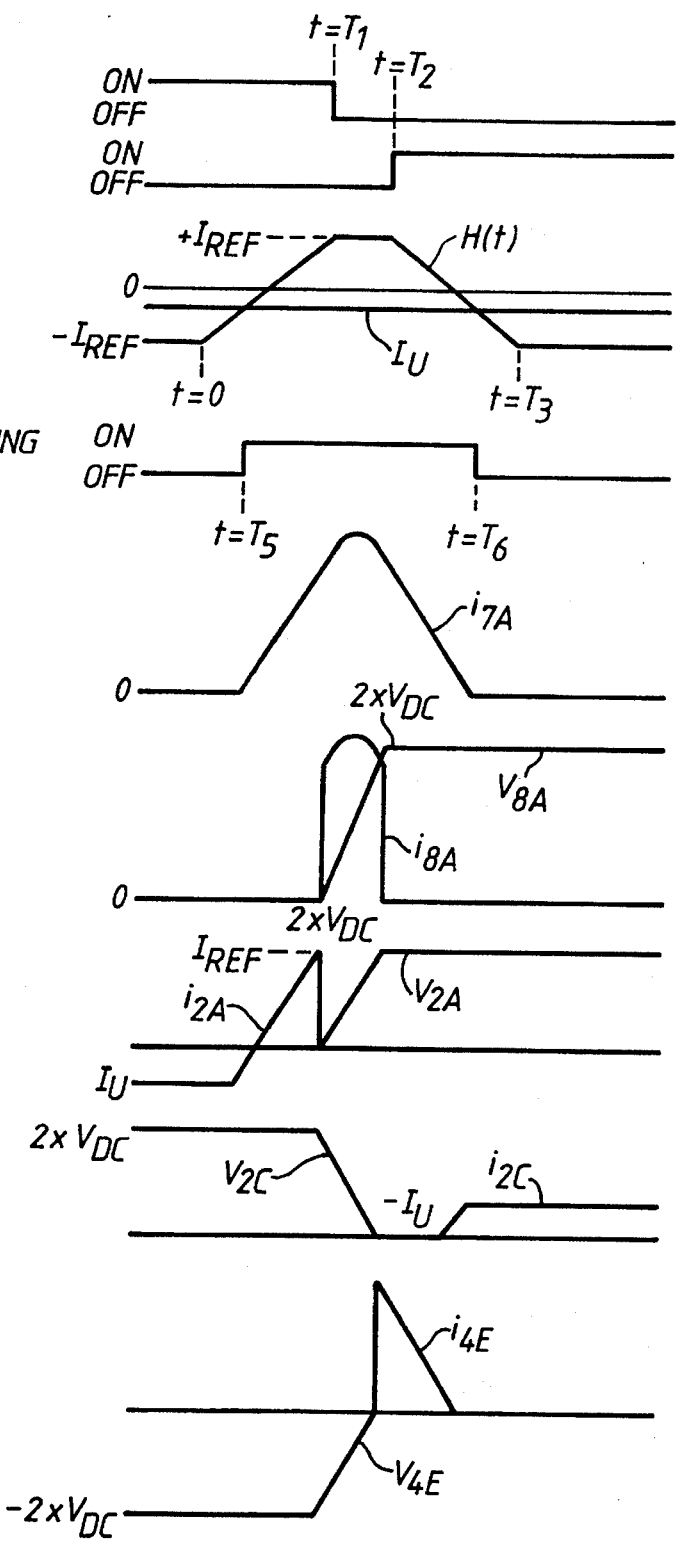
FIG. 2(A)–2(I) are waveform chart for explaining the operation of the circuit shown in FIG. 1.

The gate timing and waveform of each part are shown in FIG. 2, when output voltage $V_U$ is changed from $+2 \times V_{DC}$ (reverse conducting semiconductor switches 2A, 2B are ON and reverse conducting semiconductor switches 2C, 2D are OFF) to 0 (reverse conducting semiconductor switch 2B, 2C are ON, reverse conducting semiconductor switches 2A, 2D are OFF). In FIG. 2, it is assumed that a change-over instruction is output at a time t=0.

Synchronizing with the change-over instruction, in a control circuit (not shown) for this power converter, a carrier wave H(t) is output as shown in FIG. 2(A). Carrier wave H(t) is expressed by Expression (5):

$$H(t) = -I_{REF}, \quad t<0, \, t>T_3$$

$$H(t) = -I_{REF} + V_{DC} \times t/(2 \times L), \quad 0 \leq t < T_1$$

$$H(t) = I_{REF}, \quad T_1 \leq t < T_2$$

$$H(t) = 3 \times I_{REF} \times (3 - V_{DC} \times t/(2 \times L)), \quad T_2 \leq t < T_3 \quad (5)$$

The following control operations are executed in the control circuit (not shown).

Where, $I_{REF}$ is a reference turn-off current and is a larger value than the instantaneous maximum output current. Time t in Expression (5) is measured from a time (t=0) when the change instruction is issued. Times $T_1$, $T_2$ and $T_3$ are shown in Expression (6), respectively.

$$T_1 = 2 \times I_{REF} \times L/V_{DC}$$

$$T_2 = T_1 + 2 \times C \times V_{DC}/I_{REF}$$

$$T_3 = T_2 + T_1 \quad (6)$$

From the control circuit (not shown), the OFF signal is applied to the semiconductor switch 3A at the timing of T1 [FIG. 2(B)], and the ON signal is applied to semiconductor switch 3C at the timing of $T_2$ [FIG. 2(C)].

By comparing load current $I_U$ with carrier wave H(t), the ON signal is applied to reverse blocking semiconductor switch 5B when carrier wave H(t) becomes larger than load current $I_U$ (t=$T_5$), and the OFF signal is applied when it becomes smaller (t=$T_6$) [FIG. 2(D)].

After the reverse blocking semiconductor switch 5B is turned ON, a current $i_{2A}$ of reverse conducting semiconductor switch 2A becomes as shown by Expression (7).

$$i_{2A} = I_{REF} + V_{DC} \times (t - T_1)/L \quad (7)$$

Then, current $I_{2A}$ becomes $I_{REF}$ at time $T_1$, and reverse conducting semiconductor switch 2A is turned OFF at this time $T_1$. After this time $T_1$, a current $i_{8A}$ shown in Expression (8) flows to voltage change-rate suppression capacitor 8A and a voltage $v_{8A}$ of voltage change-rate suppression capacitor 8A becomes as shown by Expression (9).

$$\begin{aligned} i_{8A} &= I_{REF} \times \cos(\omega \times (t - T_1)) + \\ & \quad V_{DC} \times \sin(\omega \times (t - T_1))/(\omega \times L) \approx I_{REF} \end{aligned} \quad (8)$$

$$\begin{aligned} v_{8A} &= V_{DC} \times \{1 - \cos(\omega \times (t - T_1))\} + \\ & \quad I_{REF} \times \sin(\omega \times (t - T_1))/(\omega \times C) \\ & \approx I_{REF} \times (t - T_1)/C \end{aligned} \quad (9)$$

Where, $\omega = 1/(LC)^{1/2}$. Further, the approximate expression is the case when it is assumed that $L \times I_{REF}$ is extremely larger than $C \times V_{DC}$.

Voltage $v_{8A}$ of voltage change-rate suppressing capacitor 8A becomes $2 \times V_{DC}$ at time $T_2$. As a result, diode 4E becomes the ON state and voltage $v_{8A}$ of voltage change-rate suppressing capacitor 8A is clamped at $2 \times V_{DC}$ [FIG. 2(E)].

Thereafter, as voltage $-V_{DC}$ is applied to reactor 7A, an current $i_{7A}$ of reactor 7A is attenuated, and the current flowing through reactor 7A and reverse blocking semiconductor switch 5B becomes zero at t=$T_6$ [FIG. 2(F)].

During the period described above (t>0), voltages $V_{2A}$, $v_{2C}$ between the anodes and the cathodes of reverse conducting semiconductor switches 2A and 2C become as shown by Expression (10), respectively.

$$v_{2A} = v_{8A}$$

$$v_{2C} = 2 \times V_{DC} v_{2A} \quad (10)$$

As described above, when semiconductor switch 3A is turned OFF, the increase of voltage $v_{2A}$ of reverse conducting semiconductor switch 2A and the decrease of voltage $v_{2C}$ of reverse conducting semiconductor switch 2C are suppressed by charging capacitor 8A, and voltages $v_{2A}$ and $v_{2C}$ change as the ramp function state. Further, as a voltage $v_{3C}$ of semiconductor switch 3C can be reduced to zero before turning semiconductor switch 3C ON, the surge current, which is generated in the conventional converter, is not generated when switch 3C is turned ON.

To change output voltage $V_U$ from 0 (reverse conducting semiconductor switches 2B, 2C are ON state, and reverse conducting semiconductor switches 2A, 2D are OFF state) to $-2 \times V_{DC}$ (reverse conducting semiconductor switches 2C, 2D are ON state, and reverse conducting semiconductor switches 2A, 2B are OFF state), it can be achieved by substituting reverse conducting semiconductor switches 2A, 2C and reverse blocking semiconductor switch 5B by reverse conducting semiconductor switches 2B, 2D and reverse blocking semiconductor switch 5D, respectively, so that the details will be omitted.

Similarly, output voltage $V_U$ can be changed from $-2 \times V_{DC}$ to 0 by substituting reverse conducting semiconductor switches 2A, 2C and reverse blocking semiconductor switch 5B by reverse conducting semiconductor switches 2D, 2B and reverse blocking semiconductor switch 5C, respectively. Output voltage $V_U$ can also be changed from 0 to $+2 \times V_{DC}$ by substituting reverse conducting semiconductor switches 2A, 2C and reverse blocking semiconductor switch 5B by reverse conducting semiconductor switches 2C, 2A and reverse blocking semiconductor switch 5A, respectively.

From Expressions (g) and (10), the change-rates of the voltages between the anodes and the cathodes of the reverse conducting semiconductor switches are constant regardless of the magnitude and direction of the load current. Therefore, in this embodiment there is no dead time period which existed in conventional converters.

Voltage changes of the reverse conducting semiconductor switches can be suppressed by charging the voltage change-rate suppressing capacitors by flowing the breaking-currents of reverse conducting semiconductor switches to voltage change-rate suppressing capacitors. Further, the semiconductor switches are turned ON after reducing the voltage applied to the semiconductor switches to zero. As a result, surge voltage as well as surge current will not be generated in this embodiment.

Further, in this embodiment, it is still possible to obtain good waveforms at less switching frequency which is a feature of the neutral-point-clamped converter. It is also possible that high voltage conversion can be made with low withstand voltage semiconductor switches.

In addition, switching loss can be made small, because the energies of the voltage change-rate suppressing capacitors are not consumed by resistors, etc. of snubber circuits (not shown) for semiconductor switches 3A–3D.

Figure 3:
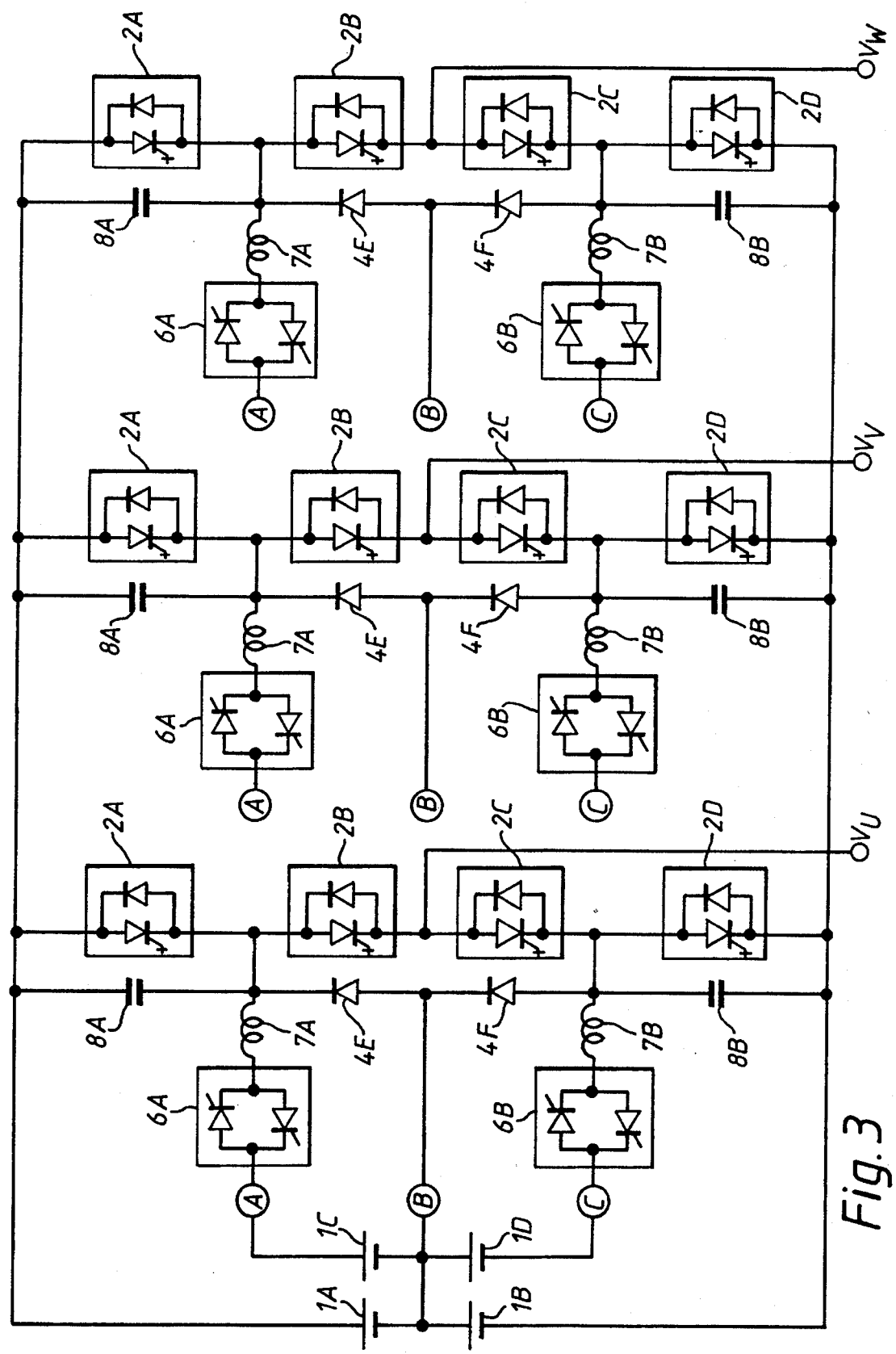
FIG. 3 is a circuit diagram showing a power converter according to a second embodiment of this invention.

FIG. 3 is a circuit diagram showing a neutral-point-clamped power converter according to a second embodiment of this invention.

In FIG. 3, the construction of this embodiment is the same as the circuit construction shown in FIG. 1 but expanded to a three-phase power converter. The component elements shown in FIG. 3 correspond to the component elements shown in FIG. 1 with the same reference numerals assigned.

In FIG. 3, $V_U$, $V_V$ and $V_W$ designate a U-phase, a V-phase and a W-phase output voltages of this converter, respectively.

The operation of this embodiment is the same as the power converter shown in FIG. 1 except that the converter in this embodiment is a three-phase converter, so that the detailed description will be omitted.

Although this embodiment is a three-phase power converter, only one set of DC power sources 1C and 1D is sufficient enough. Further, DC power sources 1C and 1D are commonly usable even when the number of phases increases.

Figure 4:
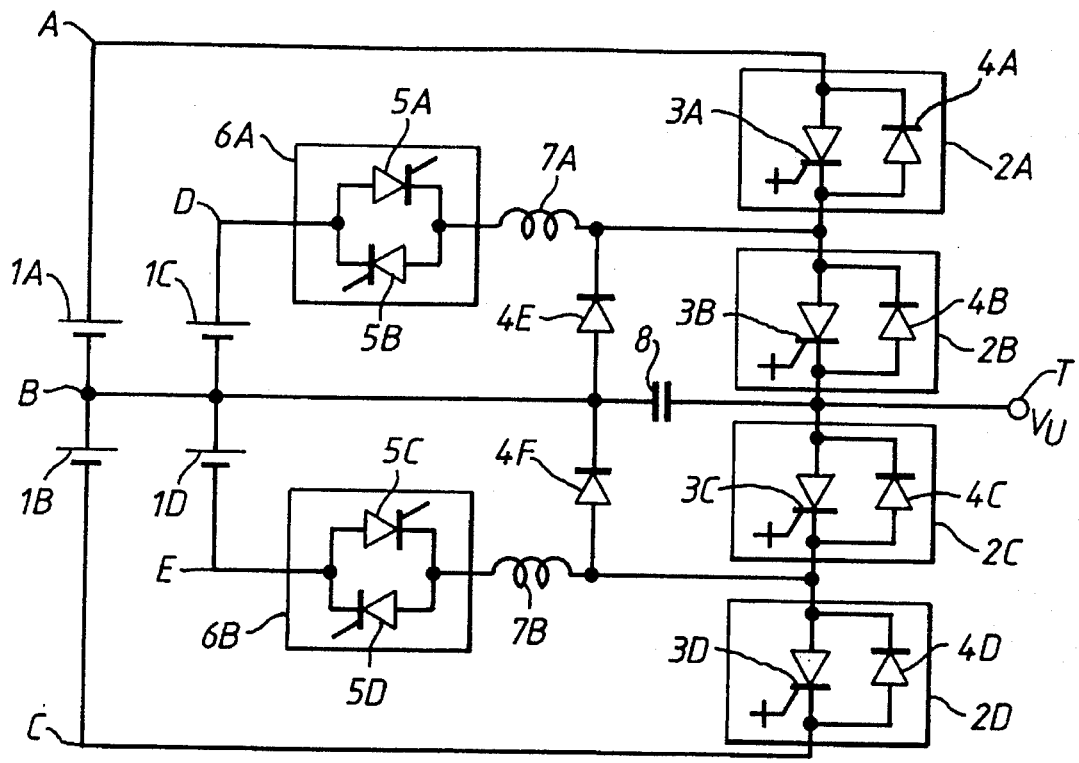
FIG. 4 is a circuit diagram showing a power converter according to a third embodiment of this invention.

FIG. 4 is a circuit diagram showing a neutral-point-clamped power converter according to a third embodiment of this invention.

As shown in FIG. 4, a voltage change-rate suppressing capacitor 8 is connected between neutral-point voltage terminal B (the connecting point of diodes 4E and 4F) and output terminal T, instead of providing voltage change-rate suppressing capacitors 8A, 8B shown in FIG. 1.

In this case, the capacity of voltage change-rate suppressing capacitor 8 is the same as capacity C of voltage change-rate suppressing capacitors 8A, 8B in the first embodiment. Other component elements correspond to those elements with the same reference numerals assigned in FIG. 1.

The operation and waveform of each semiconductor switch are the same as those shown in FIG. 2. In this embodiment, one voltage change-rate suppressing capacitor 8 can suppress the voltage change-rates of reverse conducting semiconductor switches 2A–2D.

In this embodiment, the same effect is obtained as in the first embodiment. In addition, the voltage change-rates of four reverse conducting semiconductor switches 2A–2D can be suppressed by one voltage change-rate suppressing capacitor 8, and therefore, the construction of this embodiment can be made more simple than the first embodiment.

Figure 5:
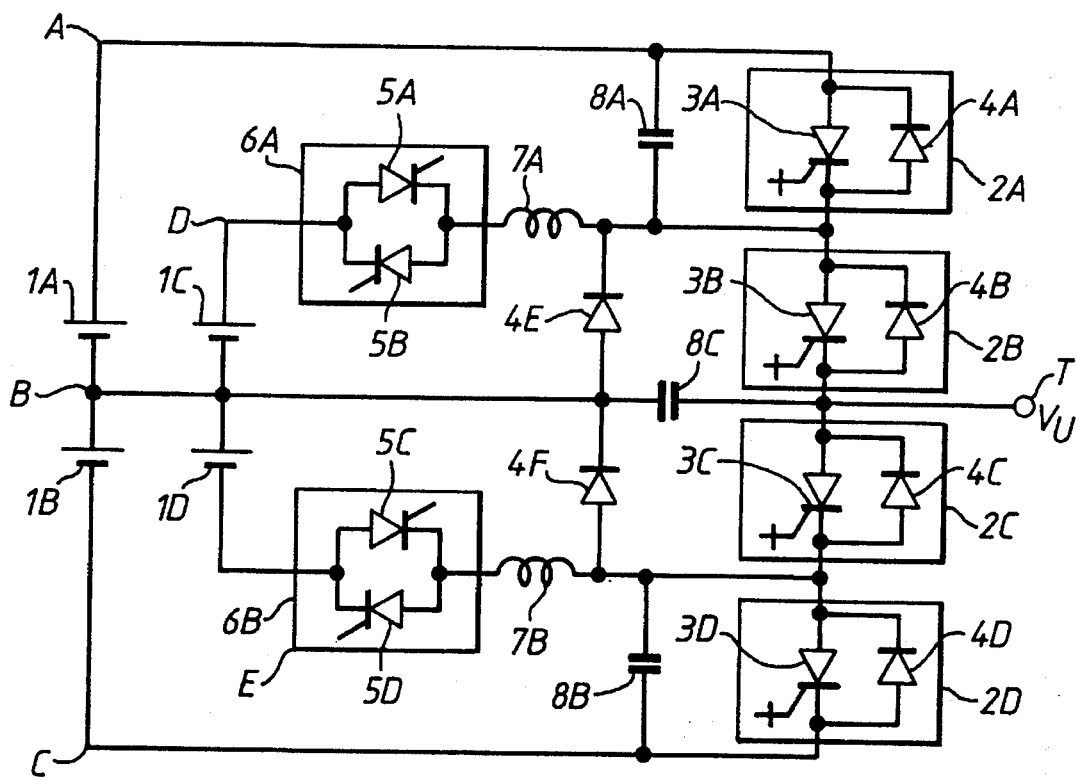
FIG. 5 is a circuit diagram showing a power converter according to a fourth embodiment of this invention.

FIG. 5 is a circuit diagram showing a neutral-point-clamped power converter according to a fourth embodiment of this invention.

As shown in FIG. 5, this embodiment differs from the embodiment shown in FIG. 1 in that a voltage change-rate suppressing capacitor 8C is newly connected between neutral-point power terminal B (the connecting point of diode 4E and 4F) and output terminal T.

In this embodiment, the capacities of voltage change-rate suppressing capacitors 8A and 8B are equal. The sum of the capacities of voltage change-rate suppressing capacitors 8A and 8C in this embodiment is equal to capacity C of voltage change-rate suppressing capacitor 8A is the first embodiment. Other component elements correspond to those elements in FIG. 1 with the same reference numerals assigned.

The operation and waveform of each semiconductor switch will be omitted, as they are the same as those shown in FIG. 2.

In this embodiment, the same effect can be obtained as in the first embodiment shown in FIG. 1. Furthermore, voltage change-rate suppressing capacitors 8A–8C are arranged adjacent to reverse conducting semiconductor switches 2A–2D, this embodiment is hardly affected by floating inductance existing in the main circuit of this power converter.

Figure 6:
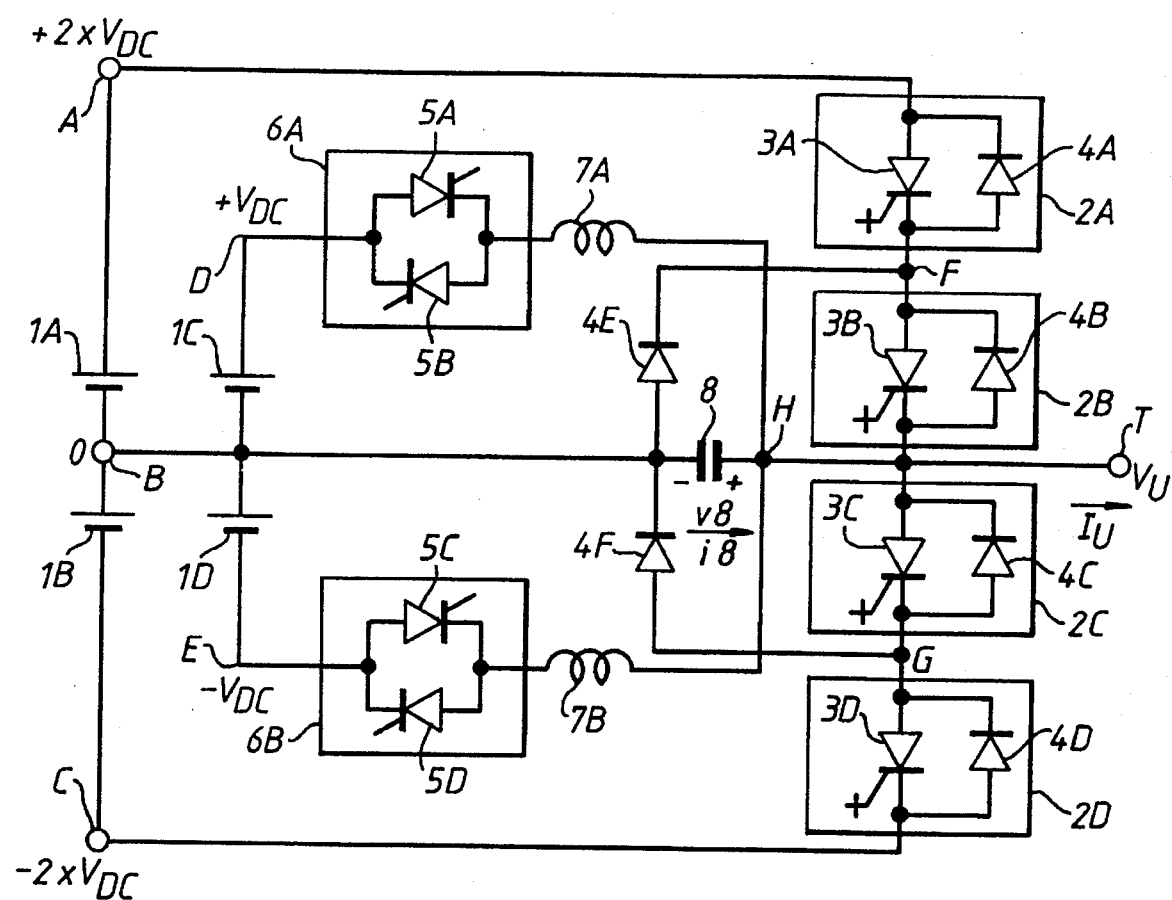
FIG. 6 is a circuit diagram showing a power converter according to a fifth embodiment of this invention.

FIG. 6 is a circuit diagram showing a neutral-point-clamped power converter according to a fifth embodiment of this invention.

As shown in FIG. 6, this embodiment differs from the conventional neutral-point-clamped power converter shown in FIG. 13 in the following points. That is, positive side intermediate voltage terminal D having a predetermined potential between the potential of positive side power terminal A and that of neutral-point power terminal D, and negative side intermediate voltage terminal E having a predetermined potential between the potential of negative side power terminal C and that of neutral-point power terminal B are provided.

Further, a first commutation circuit composed of a series circuit of reactor 7A and two-way semiconductor switch 6A which is composed of reverse blocking semiconductor switches 5A, 5B connected in anti-parallel and is capable of controlling forward and reverse currents individually, is connected between positive side intermediate voltage terminal D and AC output terminal T.

In addition, a second commutation circuit composed of a series circuit of reactor 7B and two-way semiconductor switch 6B which is composed of reverse blocking semiconductor switches 5C, 5D connected in anti-parallel and is capable of controlling forward and reverse currents individually, is connected between negative intermediate voltage terminal E and AC output terminal T.

Further, voltage change-rate suppressing capacitor 8 is connected between neutral-point power terminal B (the connecting point of diodes 4E, 4F) and output terminal T (the connecting point of reverse conducting semiconductor switches 2B, 2C). The construction of other component elements are the same as the conventional power converter shown in FIG. 13.

Hereinafter, the operation of the embodiment shown in FIG. 6 will be described referring to FIG. 7. First, the circuit conditions will be described. Here, it is assumed that the capacity of reactors 7A, 7B is L and the capacity of voltage change-rate suppressing capacitor 8 is C. Further, DC power sources 1A, 1B have voltage of $2 \times V_{DC}$ and the potentials of terminals A, B and C are $+2 \times V_{DC}$, 0 and $-2 \times V_{DC}$, respectively. In addition, DC power sources 1C, 1D have voltage of $V_{DC}$, intermediate voltage terminals D and E have potentials $+V_{DC}$ and $-V_{DC}$, respectively, and load current is $I_U$. Furthermore, the changing amount of load current $I_U$ during the switching is disregarded.

To change output voltage $V_U$ from $+2 \times V_{DC}$ (reverse conducting semiconductor switches 2A, 2B are in the ON state and reverse conducting semiconductor switches 2C, 2D are in the OFF state) to 0 potential (reverse conducting semiconductor switches 2B, 2C are in the ON state and reverse conducting semiconductor switches 2A, 2D are in the OFF state), the operation is as shown below. Further, when output voltage $V_U$ is $+2 \times V_{DC}$, a terminal voltage $v_8$ of voltage change-rate suppressing capacitor 8 is $+2 \times V_{DC}$.

First, reverse blocking semiconductor switch 5B is turned OFF at a time $T_{11}$. Voltage $V_{DC}$ is applied to reactor 7A in the closed loop of DC power source 1A, reverse conducting semiconductor switches 2A, 2B, reactor 7A and reverse blocking semiconductor switch 5B, and a current $i_{2A}$ of reverse conducting semiconductor switch 2A is built up at a slope of $V_{DC}/L$.

Reverse conducting semiconductor switch 2A is turned OFF at a time $T_{12}$ when current $i_{2A}$ flowing through reverse conducting semiconductor switch 2A becomes reference turn-off current $I_{REF}$. Further, a time period T from when reverse blocking semiconductor switch 5B is turned ON ($t=T_{11}$) until reverse conducting semiconductor switch 2A is turned OFF ($t=T_{12}$) is expressed by Expression (11).

$$T = L \times (I_{REF} - I_U)/V_{DC} \quad (11)$$

After reverse conducting semiconductor switch 2A is turned OFF at time $T_{12}$ when current $i_{2A}$ reaches current $I_{REF}$, a current $i_8$ shown in Expression (12) flows to voltage change-rate suppressing capacitor 8, and a voltage $v_8$ of capacitor 8 becomes as shown by Expression (13).

$$i_8 = I_{REF} \times \cos(\omega \times (t - T_{12})) + \quad (12)$$
$$V_{DC} \times \sin(\omega \times (t - T_{12}))/(\omega \times L)$$
$$\approx I_{REF}$$

$$v_8 = V_{DC} \times \{3 - \cos(\omega \times (t - T_{12}))\} - \quad (13)$$
$$I_{REF} \times \sin(\omega \times (t - T_{12}))/(\omega \times C)$$
$$\approx 2 \times V_{DC} - I_{REF} \times t/C$$

Where, time t is measured from time $T_{12}$ when switch 2A is turned OFF (t=0) and $\omega = 1/(LC)^{1/2}$. Further, the approximate expression is when $L \times I_{REF}$ is extremely larger than $C \times V_{DC}$.

Output voltage $V_U$ is equal to voltage $v_8$ of voltage change rate suppressing capacitor 8, and voltages $v_{2A}$ and $v_{2C}$ of reverse conducting semiconductor switch 2A and 2C will become as shown in Expression (14).

$$v_{2A} = 2 \times V_{DC} - v_8$$
$$v_{2C} = v_8 \quad (14)$$

When output voltage $V_U$ becomes 0, the forward voltage is applied to diode 4E which will become the conductive state. Further, as voltage $v_{2C}$ of reverse conducting semiconductor switch 2C also becomes 0, switch 2C is turned ON at this time (t=$T_{13}$).

When output voltage $V_U$ becomes 0 at time $T_{13}$, a current $i_{7A}$ of reactor 7A is attenuated at a slope of $V_{DC}/L$, and current $i_{7A}$ of reactor 7A and the current of reverse blocking semiconductor switch 5B are attenuated to zero. When the current of reverse conducting semiconductor switch 5B becomes 0 at a time $T_{14}$, the turn OFF signal is applied to semiconductor switch 5B.

As described above, when semiconductor switch 3A is turned OFF, the change rates of voltages $v_{2A}$, $v_{2C}$ of reverse conducting semiconductor switches 2A and 2C are suppressed by charging voltage change-rate suppressing capacitor 8, and voltages $v_{2A}$, $v_{2C}$ change as the ramp function state. Further, as voltage $v_{3C}$ of semiconductor switch 3C can be reduced to zero before turning semiconductor switch 3C ON, the surge current, which is observed in the conventional power converter shown in FIG. 13, is not generated when switch 3C is turned ON.

To change output voltage $V_U$ from 0 (reverse conducting semiconductor switches 2B, 2C are in the ON state and reverse conducting semiconductor switches 2A, 2D are in the OFF state) to $-2 \times V_{dc}$ (reverse conducting semiconductor switches 2C, 2D are in the ON state and reverse conducting semiconductor switches 2A, 2B are in the OFF state), it can be achieved by substituting reverse conducting semiconductor switches 2A, 2C and reverse blocking semiconductor switch 5B by reverse conducting semiconductor switches 2B, 2D and reverse blocking semiconductor switch 5D, respectively, so that the details will be omitted here.

Further, output voltage $V_U$ can be changed from $-2 \times V_{DC}$ to 0 by substituting reverse conducting semiconductor switches 2A, 2C and reverse blocking semiconductor switch 5B by reverse conducting semiconductor switches 2D, 2B and reverse blocking semiconductor switch 5C, respectively. Output voltage $V_U$ can also be changed from 0 to $+2 \times V_{DC}$ by substituting reverse conducting semiconductor switches 2A, 2C and reverse blocking semiconductor switch 5B by reverse conducting semiconductor switches 2C, 2A and reverse blocking semiconductor switch 5A, respectively.

Further, in FIG. 6, although voltage change-rate suppressing capacitor 8 is connected between neutral-point power terminal B and a point H to suppress the change-rates of voltages of reverse conducting semiconductor switches 2A–2D, voltage change rate suppressing capacitors may be provided separately for reverse conducting semiconductor switches 2A, 2C and reverse conducting semiconductor switches 2B, 2D, respectively.

That is, even when a voltage change-rate suppressing capacitor for reverse conducting semiconductor switches 2A and 2C is connected between any terminal having a fixed potential (terminal A, B, C, D or E in this case) and either terminal F or H, or a combination of these voltage change-rate suppressing capacitors as described above may be connected, the change-rates of voltages of semiconductor switches 2A, 2C can be suppressed.

The combination described above means that, for example, a first voltage change-rate suppressing capacitor is connected between terminals A and F, and a second voltage change-rate suppressing capacitor is connected between terminals E and H.

Similarly, even when a voltage change-rate suppressing capacitor for reverse conducting semiconductor switches 2B and 2D is connected between any terminal having the fixed potential described above and either terminal G or H, or a combination of these voltage change-rate suppressing capacitors as described above may be connected, the change-rates of voltages of semiconductor switches 2B, 2D can be suppressed.

Figure 8:
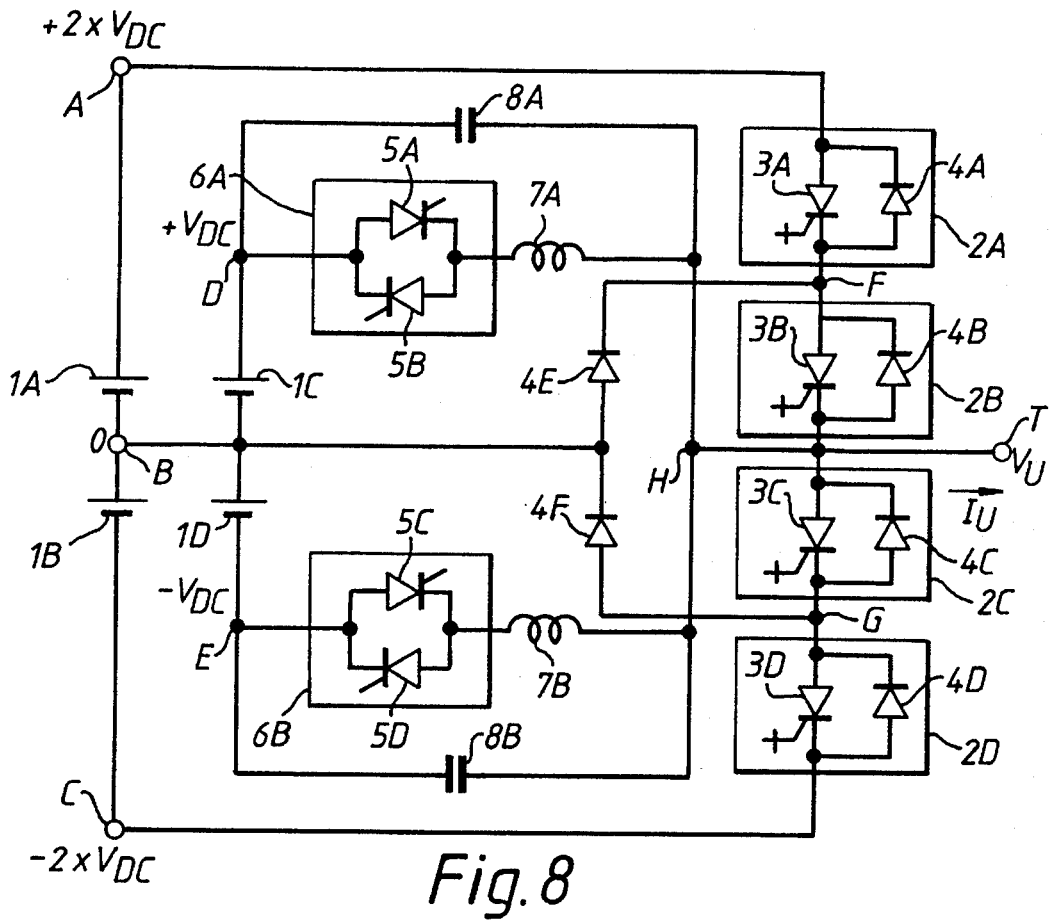
FIG. 8 is a circuit diagram showing a power converter according to s modification of the fifth embodiment of this invention.
Figure 9:
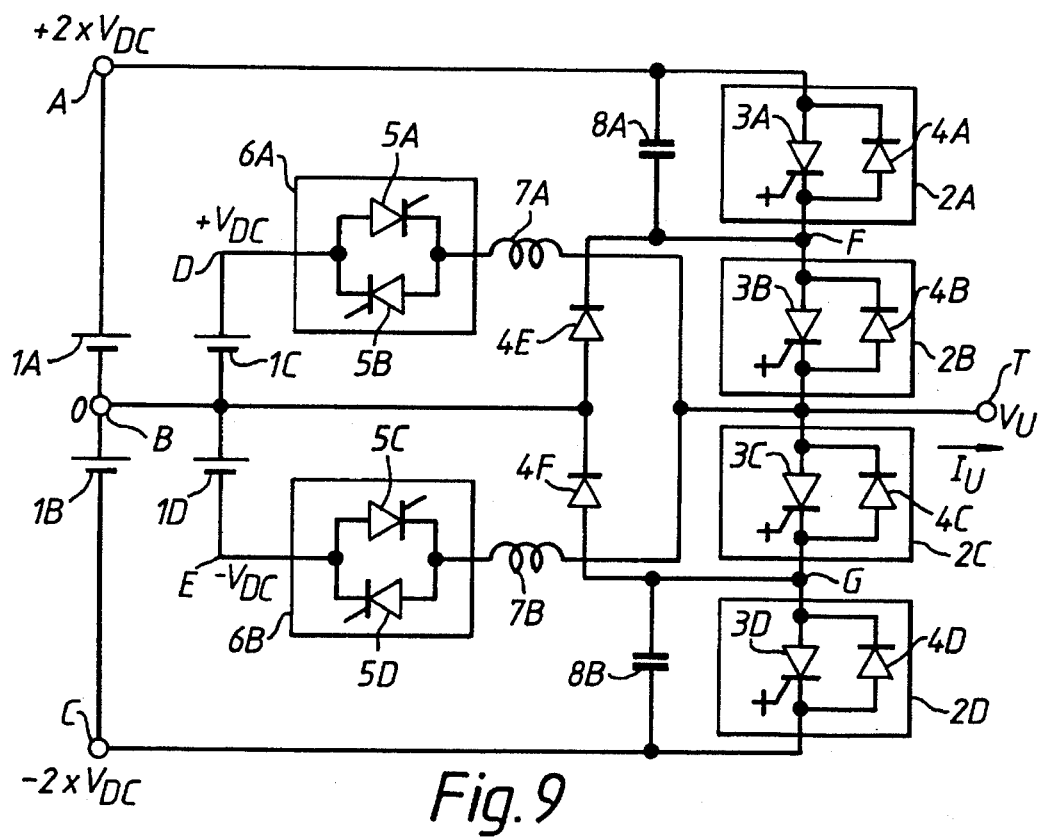
FIG. 9 is a circuit diagram showing a power converter according to another modification of the fifth embodiment of this invention.

FIGS. 8 and 9 show the cases wherein voltage change-rate suppressing capacitors 8A, 8B are provided and connected as shown below, instead of voltage change-rate suppressing capacitor 8 in FIG. 6. That is, in FIG. 8 voltage change-rate suppressing capacitor 8A is connected in parallel to the first commutation circuit composed of two-way semiconductor switch 6A and reactor 7A in parallel. Similarly, a voltage change-rate suppressing capacitor 8B is connected in parallel to the second commutation circuit composed of two-way semiconductor switch 6B and reactor 7B.

Further, in FIG. 9 voltage change-rate suppressing capacitor 8A is connected in parallel to reverse conducting semiconductor switch 2A, and voltage change-rate suppressing capacitor 8B is connected in parallel to reverse conducting semiconductor switch 2D.

Except the points described above, other constructions of the circuits shown in FIGS. 8 and 9 are the same as those shown in FIG. 6, and the switching operations thereof are the same as that of the circuit shown in FIG. 6.

According to the fifth embodiment described above, the following effects are obtained.

The timing and the change-rates of the voltages between the anode and the cathode of reverse conducting semiconductor switches 2A–2D are constant regardless of the magnitude and direction of the load current. Therefore, in this embodiment there is no dead time period which existed in conventional power converters.

Voltage changes of reverse conducting semiconductor switches 2A–2D can be suppressed by charging voltage change-rate suppressing capacitors 8, 8A, 8B by flowing the turn-off currents of reverse conducting semiconductor switches 2A–2D to voltage change-rate suppressing capacitors 8, 8A, 8B. Further, the semiconductor switches 2A–2D are turned ON after reducing the voltages applied to semiconductor switches 2A–2D to zero. As a result, no surge voltage and surge current are generated in this embodiment.

In addition, in this embodiment, it is still possible to get good waveforms at less switching frequency which is a feature of a neutral-point-clamped power converter.

Furthermore, the switching loss can be made small, because the energies of voltage change-rate suppressing capacitors 8, 8A, 8B are not consumed by resistors, etc of snubber circuits (not shown) for semiconductor switches 3A–3D.

Figure 10:
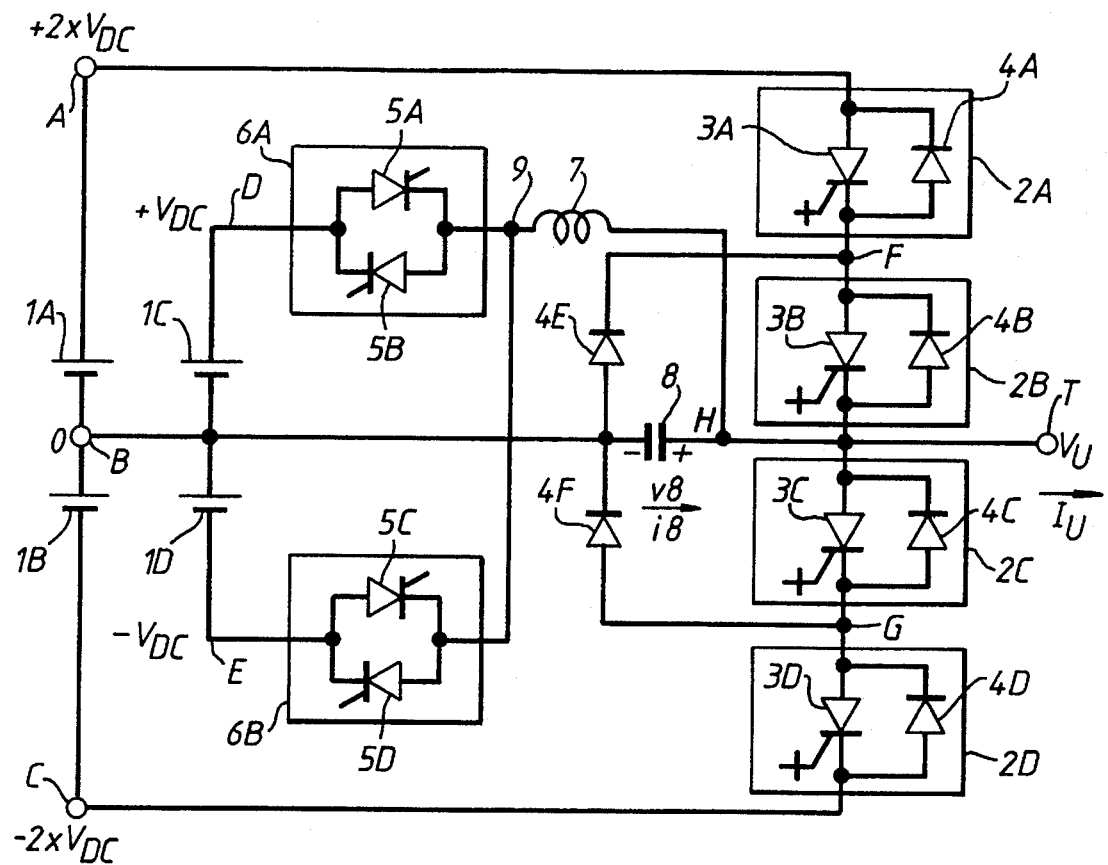
FIG. 10 is a circuit diagram showing a power converter according to s sixth embodiment of this invention.

FIG. 10 is a circuit diagram showing a neutral-point-clamped power converter according to a sixth embodiment of this invention.

As shown in FIG. 10, a commutation circuit composed of a series connected circuit of a reactor 7 and two-way semiconductor switch 6A capable of controlling forward and reverse currents individually is connected between positive side intermediate voltage terminal D and AC output terminal T. Two-way semiconductor switch 6B capable of controlling forward and reverse currents individually is connected between negative side intermediate voltage terminal E and a connecting point a of two-way semiconductor switch 6A with reactor 7. Other constructions are the same as those in the embodiment shown in FIG. 6.

Except that the reactors 7A, 7B are consolidated into one reactor 7, the operation of this embodiment is the same as that shown in FIG. 6. Accordingly, the number of components in the circuit of the power converter shown in FIG. 10 can be reduced. Furthermore, in the circuits shown in FIGS. 8 and 9, reactors 7A and 7B may be consolidated into one reactor 7.

Figure 11:
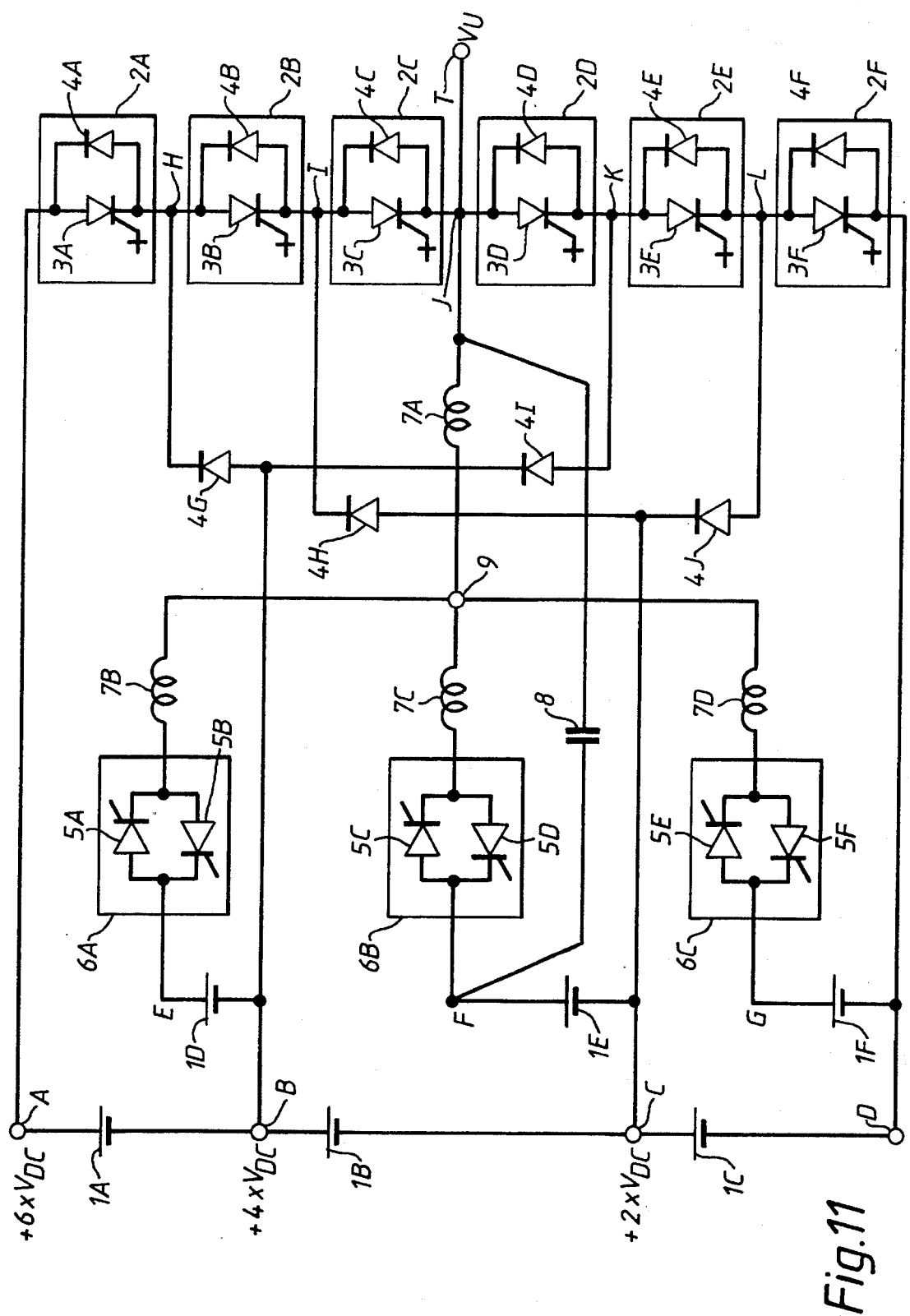
FIG. 11 is a circuit diagram showing a power converter according to a seventh embodiment of this invention.

FIG. 11 is a circuit diagram showing a four-value output power converter according to a seventh embodiment of this invention.

As shown in FIG. 11, three DC power sources 1A, 1B, 1C are connected in series, one of the last end side power sources of this DC power source group is designated as a first DC power source 1A, the other of the last end side of this DC power source group is designated as a third DC power source 1C, and the intermediate is designated as a second DC power source 1B. A positive side terminal of first DC power source 1A is designated as a first power terminal A, a positive side terminal of second DC power source 1B is designated as a second power terminal B, a positive side terminal of third DC power source 1C is designated as a third power terminal C, and a negative side terminal of third DC power source 1C is designated as a fourth power terminal D.

The multi-level output power converter of this embodiment is constructed as described below. That is, a reverse conducting positive side semiconductor switch group 2A–2C connecting reverse conducting positive side semiconductor switches 2A, 2B, 2C in series is connected between power terminal A and an output terminal T of this power converter. Reverse conducting positive side semiconductor switch 2A connected to power terminal A is first operated. A reverse conducting negative side semiconductor switch group 2D–2F connecting reverse conducting negative side semiconductor switches 2D, 2E, 2F in series is connected between power terminal D and output terminal T. Reverse conducting negative side semiconductor switch 2F connected to power terminal D is first operated. Diode 4G is connected in the forward direction from power terminal B toward an anode H of reverse conducting positive side semiconductor switch 2B. Diode 4H is connected in the forward direction from Dower terminal C toward an anode I of reverse conducting positive side semiconductor switch 3C. Diode 4I is connected in the reverse direction from power terminal B toward an anode K of reverse conducting negative side semiconductor switch 2E. Diode 4J is connected in the reverse direction from power terminal C toward an anode L of reverse conducting negative side semiconductor switch 3F.

There are further provided three DC power sources 1D, 1E and 1F. There are further provided in the multi-level output power converter of this embodiment, an intermediate voltage terminal E of DC power source 1D having a predetermined potential between the potentials of power terminals A and B, an intermediate voltage terminal F of DC power source 1E having a predetermined potential between the potentials of power terminals B and C, and an intermediate voltage terminal G of DC power source 1F having a predetermined potential between the potentials of power terminals C and D.

Further, there are provided three two-way semiconductor switches 6A–6C composed respectively of reverse blocking semiconductor switches 5A, 5B, 5C, 5D and 5E, 5F connected in anti-parallel so that forward and reverse currents thereof can be controlled individually. Three commutation circuits equipped with series circuits of two-way semiconductor switches 6A, 6B and 6C and reactors 7B, 7C and 7D are connected between intermediate voltage terminals E, F and G and an intermediate terminal 9, respectively. A reactor 7A is connected between output terminal T and intermediate terminal 9.

Further, a voltage change-rate suppressing capacitor 8 is connected between terminal F and the connecting point of reverse conducting semiconductor switches 2C, 2D. Further, the common connecting point of the reactors 7B, 7C and 7D serves as intermediate terminal 9.

Hereinafter, the operation of the embodiment shown in FIG. 11 will be described. Before describing the operation, the circuit conditions will be described. DC power sources 1A–1C generate voltage $2 \times V_{DC}$, respectively, and terminals A, B, C and D have voltage $+6 \times V_{DC}$, $+4 \times V_{DC}$, $2 \times V_{DC}$, and 0, respectively.

DC power sources 1D–1E generate voltage $V_{DC}$, respectively, and terminals E, F and G have voltage $+5 \times V_{DC}$, $+3 \times V_{DC}$ and $+V_{DC}$, respectively. Further, it is possible to omit reactors 7A, or it is possible to omit reactors 7B–7D.

To change output voltage $V_U$ from $+6 \times V_{DC}$ (reverse conducting semiconductor switches 2A, 2B, 2C are ON and reverse conducting semiconductor switches 2D, 2E, 2F are OFF) to $+4 \times V_{DC}$ (reverse conducting semiconductor switches 2B, 2C, 2D are ON and reverse conducting semiconductor switches 2A, 2E, 2F are OFF), reverse blocking semiconductor switch 5B is operated. The detail of the operation of this embodiment is omitted here as it is the same as the embodiment shown in FIG. 6.

Similarly, to change output voltage $V_U$ from $+4 \times V_{DC}$ to $+2 \times V_{DC}$, from $+2 \times V_{DC}$ to 0, from 0 to $+2 \times V_{DC}$, from $+2 \times V_{DC}$ to $+4 \times V_{DC}$ and from $+4 \times V_{DC}$ to $+6 \times V_{DC}$, reverse blocking semiconductor switches 5D, 5F, 5E, 5C and 5A are operated, respectively.

Further in FIG. 11, the change-rates of the voltages of reverse conducting semiconductor switches 2A–2F are suppressed by connecting voltage change-rate suppressing capacitor between the terminals F and J. However, it is also possible to provide voltage change-rate suppressing capacitors for respective reverse conducting semiconductor switches 2A–2D, 2B–2E and 2C–2F, individually.

Definitely, it is possible to suppress the change-rates of the voltages of reverse conducting semiconductor switches 2A and 2D even when a voltage change-rate suppressing capacitor is connected between any terminal having a fixed potential terminal (A, B, C, D, E, F or G in FIG. 11) and either terminal H or J, or a combination of these voltage change-rate suppressing capacitors as described above may be connected.

It is possible to suppress the change-rates of the voltages of reverse conducting semiconductor switches 2B and 2E even when a voltage change-rate suppressing capacitor is connected between any terminal having the fixed potential described above and one of the terminals I, J and K, or a combination of these voltage change-rate suppressing capacitors as described above may be connected.

It is also possible to suppress the change-rates of the voltages of reverse conducting semiconductor switches 2C and 2F even when a voltage change-rate suppressing capacitor is connected between any terminal having the fixed potential described above and either terminal J or L, or a combination of these voltage change-rate suppressing capacitors as described above may be connected.

As described above, even in the embodiment of a multi-level output power converter, a high voltage power converter can be constructed even when the withstand voltage of reverse conducting semiconductor switches 2A–2F is low.

Furthermore, this embodiment has the same effects as the neutral-point-clamped power converter shown in FIG. 1.

Figure 12:
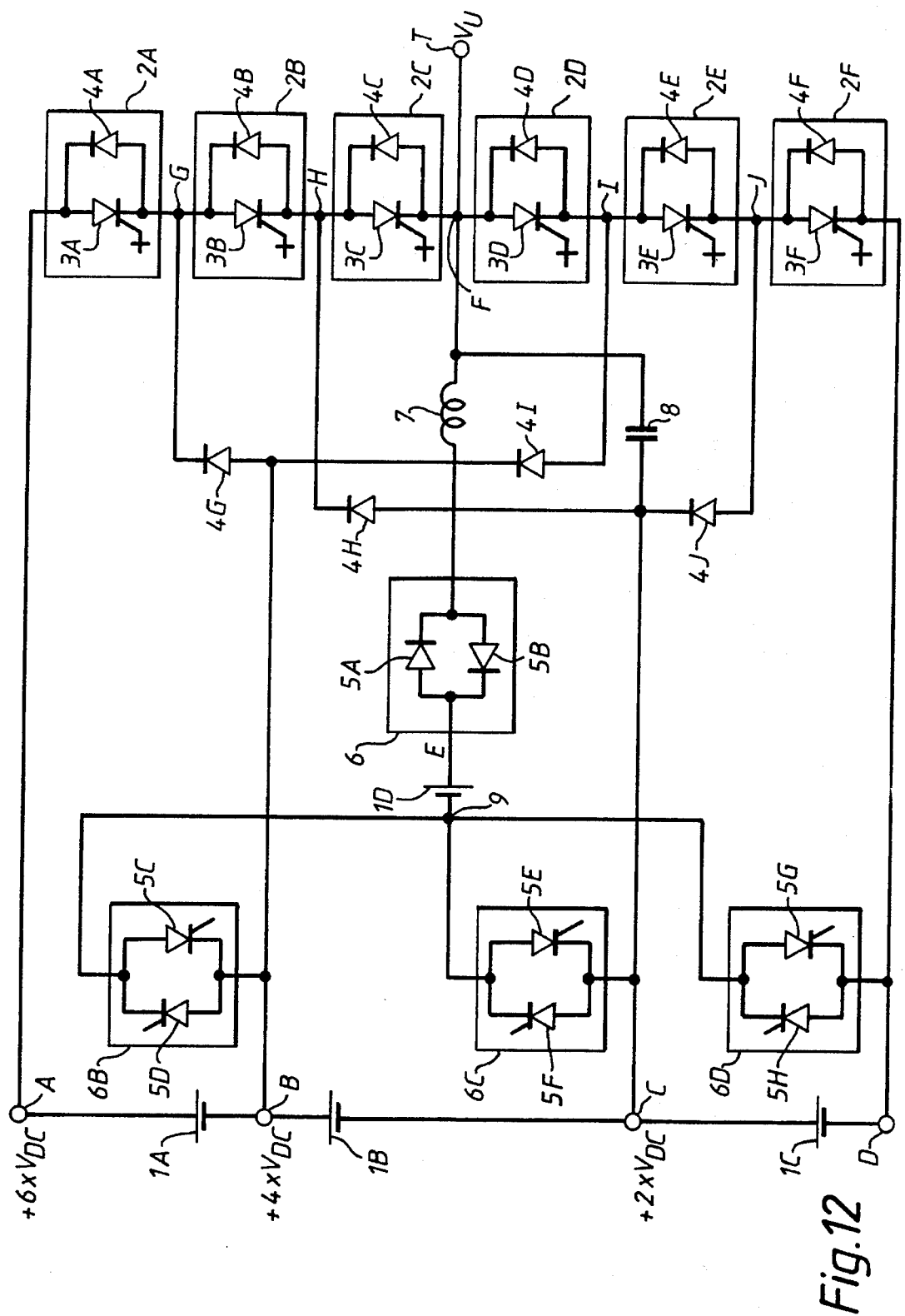
FIG. 12 is a circuit diagram showing a power converter according to an eighth embodiment of this invention.

FIG. 12 is a circuit diagram showing a four-value output power converter according to an eighth embodiment of this invention.

As shown in FIG. 12, in this embodiment the component elements of the multi-level output power converter are connected as shown below. That is, one ends of three two-way semiconductor switches 6B–6D which are capable of controlling forward and reverse currents individually are connected to power terminals B–D, respectively, and the other ends are connected commonly to intermediate terminal 9. A commutation circuit composed of a series circuit of a DC power source 1D, a two-way semiconductor switch 6 and a reactor 7 is connected between output terminal T of this power converter and common connecting point 9 of the other ends of two-way semiconductor switches 6B–6D. A voltage change-rate suppressing capacitor 8 is connected between the connecting point of diodes 4H and 4J and the anode of reverse conducting positive side semiconductor switch 3D.

Hereinafter, the operation of the embodiment shown in FIG. 12 will be described, and the circuit conditions will be first described. DC power sources 1A–1C generate voltage $2 \times V_{DC}$, respectively, and the potentials of terminals A, B, C and D shown in FIG. 12 are $+6 \times V_{DC}$, $+4 \times V_{DC}$, $+2 \times V_{DC}$ and 0, respectively. Further, DC power source 1D generates voltage of $V_{DC}$.

To change output voltage $V_U$ from $+6 \times V_{DC}$ to $+4 \times V_{DC}$ or vice versa, two-way semiconductor switch 6B is turned ON and terminal E is set at $+5 \times V_{DC}$.

Similarly, to change output voltage $V_U$ from $+4 \times V_{DC}$ to $+2 \times V_{DC}$ or vice versa, two-way semiconductor switch 6C is turned ON and terminal E is set at $+3 \times V_{DC}$.

To change output voltage $V_U$ from $+2 \times V_{DC}$ to 0 or vice versa, two-way semiconductor switch 6D is turned ON and terminal E is set at $+V_{DC}$.

To increase or decrease output voltage $V_U$ under the above conditions, reverse blocking semiconductor switch 5A or 5B are respectively, operated to increase the currents of the semiconductor switches to be turned OFF to reference turn-off current, and then the currents are turned off. Other operations are the same as those of the embodiment shown in FIG. 11.

Further, in FIG. 12 voltage change rate suppressing capacitor 8 is connected between terminals C and F. However, like-wise the preceding embodiment shown in FIG. 11, it is possible to change the location of the voltage change-rate suppressing capacitor.

In this embodiment, comparing with the embodiment in FIG. 11, the number of semiconductor switches is increased but the number of power sources can be decreased, with the result that the circuit of the power converter becomes in the simple construction.

In the above-described embodiments, gate-turn-off thyristors are used as semiconductor switches 3A etc., but this invention is not limited to these embodiments. IGBTs or transistors can be used as semiconductor switches 3A etc, in other embodiments of this invention.

According to the present invention, the following effects can be obtained. That is, it is possible to prevent generation of surge and overvoltage without being affected by a dead time and to obtain good output waveforms at relatively less switching frequency. Further, as the semiconductor switches are turned ON at zero voltage, surge voltage as well as surge current are not generated. In addition, good output waveforms are obtained at less switching frequency which is a feature of a multi-level output power converter. Furthermore, it becomes possible to reduce switching loss as the energy of voltage change-rate suppressing capacitor is not consumed by resistors, etc. Also high voltage conversion can be made with low withstand voltage semiconductor switches.

Obviously, numerous modifications and variations of the present invention are possible in light of the above teachings. It is therefore to be understood that within the scope of the appended claims, the invention may be practiced otherwise than as specifically described herein.

What is claimed is:

1. A power converter comprising:

a series circuit of a positive side DC power source and a negative side DC power source connected at a neutral-point power source terminal;

a direction from an anode to a cathode being designated as forward direction and a direction from a cathode to an anode being designated as reverse direction:

a series circuit of a positive side first reverse conducting semiconductor switch and a positive side second reverse conducting semiconductor switch connected in series in said forward direction from a positive side power source terminal of said positive side DC power source toward an AC output terminal of said power converter;

a series circuit of a negative side first reverse conducting semiconductor switch and a negative side second reverse conducting semiconductor switch connected in series in said reverse direction from a negative side power source terminal of said negative side DC power source toward said AC output terminal;

a forward diode connected from said neutral-point power source terminal toward a cathode of said positive side first reverse conducting semiconductor switch in said forward direction;

a reverse diode connected from said neutral-point power source terminal toward an anode of said negative side first reverse conducting semiconductor switch in said reverse direction;

a positive side intermediate DC power source connected to said neutral-point power source terminal for generating a predetermined voltage between potentials of said positive side power source terminal and said neutral-point power source terminal at a positive side intermediate voltage terminal;

a negative side intermediate DC power source connected to said neutral-point power source terminal for generating a predetermined voltage between potentials of said negative side power source terminal and said neutral-point power source terminal at a negative side intermediate voltage terminal;

a first commutation circuit composed of a series circuit of a two-way semiconductor switch capable of controlling forward and reverse currents individually and a reactor, connected between said positive side intermediate voltage terminal and said cathode of said positive side first reverse conducting semiconductor switch;

a second commutation circuit composed of a series circuit of a two-way semiconductor switch capable of controlling forward and reverse currents individually and a reactor, connected between said negative side intermediate voltage terminal and said anode of said negative side first reverse conducting semiconductor switch; and a voltage change-rate suppressing capacitor connected between one of said positive side power source terminal, said neutral-point power source terminal, said negative side power source terminal, said positive side intermediate voltage terminal and said negative side intermediate voltage terminal and one of connecting points of adjacent two of said positive side first reverse conducting semiconductor switch, said positive side second reverse conducting semiconductor switch, said negative side second reverse conducting semiconductor switch and said negative side first reverse conducting semiconductor switch.

2. The power converter according to claim 1, wherein said voltage change-rate suppressing capacitor includes:

a first voltage change-rate suppressing capacitor connected between an anode and said cathode of said positive side first reverse conducting semiconductor switch; and a second voltage change-rate suppressing capacitor connected between said anode and a cathode of said negative side first reverse conducting semiconductor switch.

3. The power converter according to claim 1, wherein:

said voltage change-rate suppressing capacitor is connected between said neutral-point power source terminal and said output terminal.

4. The power converter according to claim 1, wherein said voltage change-rate suppressing capacitor includes:

a first voltage change-rate suppressing capacitor connected between an anode and said cathode of said positive side first reverse conducting semiconductor switch;

a second voltage change-rate suppressing capacitor connected between said anode and a cathode of said negative side first reverse conducting semiconductor switch; and a third voltage change-rate-suppressing capacitor connected between said neutral-point power source terminal and said output terminal.

5. A power converter comprising:

a series circuit of a positive side DC power source and a negative side DC power source connected at a neutral-point power source terminal;

a direction from an anode to a cathode being designated as forward direction and a direction from a cathode to an anode being designated as reverse direction;

a series circuit of a positive side first reverse conducting semiconductor switch and a positive side second reverse conducting semiconductor switch connected in series in said forward direction from a positive side power source terminal of said positive side DC power source toward an AC output terminal of said power converter;

a series circuit of a negative side first reverse conducting semiconductor switch and a negative side second reverse conducting semiconductor switch connected in series in said reverse direction from a negative side power source terminal of said negative side DC power source toward said AC output terminal;

a forward diode connected from said neutral-point power source terminal toward a cathode of said positive side first reverse conducting semiconductor switch in said forward direction;

a reverse diode connected from said neutral-point power source terminal toward an anode of said negative side first reverse conducting semiconductor switch in said reverse direction;

a positive side intermediate DC power source connected to said neutral-point power source terminal for generating a predetermined voltage between potentials of said positive side power source terminal and said neutral-point power source terminal at a positive side intermediate voltage terminal;

a negative side intermediate DC power source connected to said neutral-point power source terminal for generating a predetermined voltage between potentials of said negative side power source terminal and said neutral-point power source terminal at a negative side intermediate voltage terminal;

a first commutation circuit composed of a series circuit of a two-way semiconductor switch capable of controlling forward and reverse currents individually and a reactor, connected between said positive side intermediate voltage terminal and said output terminal;

a second commutation circuit composed of a series circuit of a two-way semiconductor switch capable of controlling forward and reverse currents individually and a reactor, connected between said negative side intermediate voltage terminal and said output terminal; and a voltage change-rate suppressing capacitor connected between one of said positive side power source terminal, said neutral-point power source terminal, said negative side power source terminal, said positive side intermediate voltage terminal and said negative side intermediate voltage terminal and one of connecting points of adjacent two of said positive side first reverse conducting semiconductor switch, said positive side second reverse conducting semiconductor switch, said negative side second reverse conducting semiconductor switch and said negative side first reverse conducting semiconductor switch.

6. A power converter comprising:

a series circuit of a positive side DC power source and a negative side DC power source connected at a neutral-point power source terminal;

a direction from an anode to a cathode being designated as forward direction and a direction from a cathode to an anode being designated as reverse direction;

a series circuit of a positive side first reverse conducting semiconductor switch and a positive side second reverse conducting semiconductor switch connected in series in said forward direction from a positive side power source terminal of said positive side DC power source toward an AC output terminal of said power converter;

a series circuit of a negative side first reverse conducting semiconductor switch and a negative side second reverse conducting semiconductor switch connected in series in said reverse direction from a negative side power source terminal of said negative side DC power source toward said AC output terminal;

a forward diode connected from said neutral-point power source terminal toward a cathode of said positive side first reverse conducting semiconductor switch in said forward direction;

a reverse diode connected from said neutral-point power source terminal toward an anode of said negative side first reverse conducting semiconductor switch in said reverse direction;

a positive side intermediate DC power source connected to said neutral-point power source terminal for generating a predetermined voltage between potentials of said positive side power source terminal and said neutral-point power source terminal at a positive side intermediate voltage terminal;

a negative side intermediate DC power source connected to said neutral-point power source terminal for generating a predetermined voltage between potentials of said negative side power source terminal and said neutral-point power source terminal at a negative side intermediate voltage terminal;

a series circuit of a first two-way semiconductor switch capable of controlling forward and reverse currents individually and a reactor, connected between said positive side intermediate voltage terminal and said output terminal;

a second two-way semiconductor switch capable of controlling forward and reverse currents individually, connected between said negative side intermediate voltage terminal and a connecting point of said first two-way semiconductor switch and said reactor; and a voltage change-rate suppressing capacitor connected between one of said positive side power source terminal, said neutral-point power source terminal, said negative side power source terminal, said positive side intermediate voltage terminal and said negative side intermediate voltage terminal and one of connecting points of adjacent two of said positive side first reverse conducting semiconductor switch, said positive side second reverse conducting semiconductor switch, said negative side second reverse conducting semiconductor switch and said negative side first reverse conducting semiconductor switch.

7. The power converter according to claim 5 or claim 6, wherein:

said voltage change-rate suppressing capacitor is composed of a plurality of capacitors; and each of said capacitors is connected between one of said positive side power source terminal, said neutral-point power source terminal, said negative side power source terminal, said positive side intermediate voltage terminal and said negative side intermediate voltage terminal and one of connecting points of adjacent two of said positive side first reverse conducting semiconductor switch, said positive side second reverse conducting semiconductor switch, said negative side second reverse conducting semiconductor switch and said negative side first reverse conducting semiconductor switch, respectively.

8. The power converter according to claim 5 or claim 6, wherein:

said voltage change-rate suppressing capacitor is connected between said neutral-point power source terminal and said AC output terminal.

9. The power converter according to claim 5 or claim 6, wherein said voltage change-rate suppressing capacitor includes:

a first voltage change-rate suppressing capacitor connected between said positive side intermediate voltage terminal and said output terminal; and a second voltage change-rate suppressing capacitor connected between said negative side intermediate voltage terminal and said AC output terminal.

10. The power converter according to claim 5 or claim 6, wherein said voltage change-rate suppressing capacitor includes:

a first voltage change-rate suppressing capacitor connected between an anode and said cathode of said positive side first reverse conducting semiconductor switch; and a second voltage change-rate suppressing capacitor connected between said anode and a cathode of said negative side first reverse conducting semiconductor switch.

11. A power converter comprising:

a series circuit of a plurality of DC power sources composed of a first DC power source through a n-th DC power source;

a plurality of positive side terminals of said DC power sources being designated as a first power source terminal through a n-th power source terminal, respectively;

a negative side terminal of said n-th DC power source being designated as a (n+1)-th power source terminal;

a direction from an anode to a cathode being designated as forward direction and a direction from a cathode to an anode being designated as reverse direction;

a series circuit of a plurality of positive side reverse conducting semiconductor switches composed of a positive side first reverse conducting semiconductor switch through a positive side n-th reverse conducting semiconductor switch connected in series in said forward direction from said first power source terminal toward an AC output terminal of said power converter;

said positive side first reverse conducting semiconductor switch connected to said first power source terminal being firstly operated in a plurality of said positive side reverse conducting semiconductor switches;

a series circuit of a plurality of negative side reverse conducting semiconductor switches composed of a negative side n-th reverse conducting semiconductor switch through a negative side first reverse conducting semiconductor switch connected in series in said reverse direction from said (n+1)-th power source terminal toward said AC output terminal;

said negative side n-th reverse conducting semiconductor switch connected to said (n+1)-th power source terminal being firstly operated in a plurality of said negative side reverse conducting semiconductor switches;

a plurality of forward diodes connected from said second through n-th power source terminals toward anodes of said positive side second through n-th reverse conducting semiconductor switches in said forward direction, respectively;

a plurality of reverse diodes connected from said second through n-th power source terminals toward anodes of said negative side second through n-th reverse conducting semiconductor switches in said reverse direction, respectively;

a plurality of intermediate DC power sources composed of a first intermediate DC power source through n-th intermediate DC power source connected to said second through (n+1)-th power source terminals for generating predetermined voltages between potentials of said first and second power source terminals through between potentials of said n-th and (n+1)-th power source terminals at a first intermediate voltage terminal through a n-th intermediate voltage terminal, respectively;

a plurality of commutation circuits composed of a first commutation circuit through a n-th commutation circuit, each composed of a series circuit of a two-way semiconductor switch capable of controlling forward and reverse currents individually and a reactor, connected between said first through n-th intermediate voltage terminals and an intermediate terminal, respectively;

a reactor connected between said intermediate terminal and said AC output terminal, and a voltage-change rate suppressing capacitor connected between one of said first through (n+1)-th power source terminals and said first through n-th intermediate voltage terminals and one of connecting points of adjacent two of said positive side reverse conducting semiconductor switches and said negative side reverse conducting semiconductor switches.

12. The power converter according to claim 11, wherein:

said voltage change-rate suppressing capacitor is composed of a plurality of capacitors; and each of said capacitors is connected between one of said first through (n+1)-th power source terminals and said first through n-th intermediate voltage terminals and one of connecting points of adjacent two of said positive side reverse conducting semiconductor switches and said negative side reverse conducting semiconductor switches, respectively.

13. The power converter according to claim 11, wherein:

said voltage change-rate suppressing capacitor is connected between one of said first through n-th intermediate voltage terminals and said AC output terminal.

14. A power converter comprising:

a series circuit of a plurality of DC power sources composed of a first DC power source through a n-th DC power source;

a plurality of positive side terminals of said DC power sources being designated as a first power source terminal through a n-th power source terminal, respectively;

a negative side terminal of said n-th DC power source being designated as a (n+1)-th power source terminal;

a direction from an anode to a cathode being designated as forward direction and a direction from a cathode to an anode being designated as reverse direction;

a series circuit of a plurality of positive side reverse conducting semiconductor switches composed of a positive side first reverse conducting semiconductor switch through a positive side n-th reverse conducting semiconductor switch connected in series in said forward direction from said first power source terminal toward an AC output terminal of said power converter;

said positive side first reverse conducting semiconductor switch connected to said first power source terminal being firstly operated in a plurality of said positive side reverse conducting semiconductor switches;

a series circuit of a plurality of negative side reverse conducting semiconductor switches composed of a negative side n-th reverse conducting semiconductor switch through a negative side first reverse conducting semiconductor switch connected in series in said reverse direction from said (n+1)-th power source terminal toward said AC output terminal;

said negative side n-th reverse conducting semiconductor switch connected to said (n+1)-th power source terminal being firstly operated in a plurality of said negative side reverse conducting semiconductor switches;

a plurality of forward diodes connected from said second through n-th power source terminals toward anodes of said positive side second through n-th reverse conducting semiconductive switches in said forward direction, respectively;

a plurality of reverse diodes connected from said second through n-th power source terminals toward anodes of said negative side second through n-th reverse conducting semiconductor switches in said reverse direction, respectively;

a plurality of two-way semiconductor switches, each capable of controlling forward and reverse currents individually, composed of a first two-way semiconductor switch through a n-th two-way semiconductor switch connected between said second through (n+1)-th power source terminals and an intermediate terminal, respectively;

a commutation circuit composed of a series circuit of an intermediate DC power source, a two-way semiconductor switch capable of controlling forward and reverse currents individually and a reactor, connected between said intermediate terminal and said AC output terminal;

a voltage-change rate suppressing capacitor connected between one of said first through (n+1)-th power source terminals and one of connecting points of adjacent two of said positive side reverse conducting semiconductor switches and said negative side reverse conducting semiconductor switches.

15. The power converter according to claim 14, wherein:

said voltage change-rate suppressing capacitor is composed of a plurality of capacitors; and each of said capacitors is connected between one of said first through (n+1)-th power source terminals and one of connecting points of adjacent two of said positive side reverse conducting semiconductor switches and said negative side reverse conducting semiconductor switches, respectively.

16. The power converter according to claim 14, wherein:

said voltage change-rate suppressing capacitor is connected between one of said first through (n+1)-th power source terminals and said AC output terminal.

* * * * *